(12) United States Patent
Canole et al.

(10) Patent No.: US 9,731,810 B1
(45) Date of Patent: Aug. 15, 2017

(54) SYSTEM AND METHOD FOR IMPROVING FUEL STORAGE WITHIN A WING OF AN AIRCRAFT

(71) Applicant: ROBERTSON FUEL SYSTEMS LLC, Tempe, AZ (US)

(72) Inventors: Quinn Canole, Tempe, AZ (US); William York, Tempe, AZ (US); Jeffrey Bracken, Tempe, AZ (US)

(73) Assignee: ROBERTSON FUEL SYSTEMS, L.L.C., Tempe, AZ (US)

( * ) Notice: Subject to any disclaimer, the term of this patent is extended or adjusted under 35 U.S.C. 154(b) by 103 days.

(21) Appl. No.: 14/860,943

(22) Filed: Sep. 22, 2015

Related U.S. Application Data

(60) Provisional application No. 62/053,717, filed on Sep. 22, 2014.

(51) Int. Cl.
*B64C 3/34* (2006.01)
*B64D 37/04* (2006.01)
*B64D 37/06* (2006.01)

(52) U.S. Cl.
CPC .............. *B64C 3/34* (2013.01); *B64D 37/04* (2013.01); *B64D 37/06* (2013.01)

(58) Field of Classification Search
CPC ............ B64D 37/06; B64D 37/04; B64C 3/34
See application file for complete search history.

(56) References Cited

U.S. PATENT DOCUMENTS

| | | | | |
|---|---|---|---|---|
| 2,374,386 A | * | 4/1945 | Shakesby ............... | B64D 37/06 144/260 |
| 2,407,614 A | * | 9/1946 | Montgomery ......... | B64D 37/04 244/123.1 |
| 2,464,827 A | * | 3/1949 | Noyes .................... | B64D 37/06 137/576 |
| 3,156,440 A | * | 11/1964 | Ikeda ....................... | B64C 3/00 244/123.8 |
| 3,506,224 A | * | 4/1970 | Harr ...................... | B64D 37/06 220/560.11 |

(Continued)

OTHER PUBLICATIONS

Niu, Michael Chun-Yung (1999). Airframe Structural Design—Practical Design Information and Data on Aircraft Structures (2nd Edition). (pp. 296-300). AD Adaso/Adastra Engineering LLC.*

*Primary Examiner* — Philip J Bonzell
*Assistant Examiner* — Michael Kreiner
(74) *Attorney, Agent, or Firm* — Smith Tempel; Steven P. Wigmore

(57) ABSTRACT

A system and method for improving fuel storage within the wing of an aircraft. In one exemplary embodiment, the system and method eliminate the traditional spars and ribs, and any spanwise and cordwise connecting vertical webs, within a wing. Instead, the system comprises a plurality of modified flared spars, each having a length defined by an angled hat section, to form a wing structure. The modified flared spars may also comprise one or more lengths defined by a specialized section configured to accommodate a portion of a box section, or any other internal component of the wing. The system and method may also involve a contiguous fuel bladder of any size/type. The fuel bladder for the wing may comprise a fabric coated or impregnated with an elastomeric material that may include a polyurethane dispersion layer combined with a sealant.

20 Claims, 17 Drawing Sheets

(56) References Cited

U.S. PATENT DOCUMENTS 4,432,515 A * 2/1984 Jarvineva ............... B64D 37/06
                                              244/123.5
6,698,692 B1 * 3/2004 Tichenor ................ B64D 37/24
                                              244/135 R

* cited by examiner

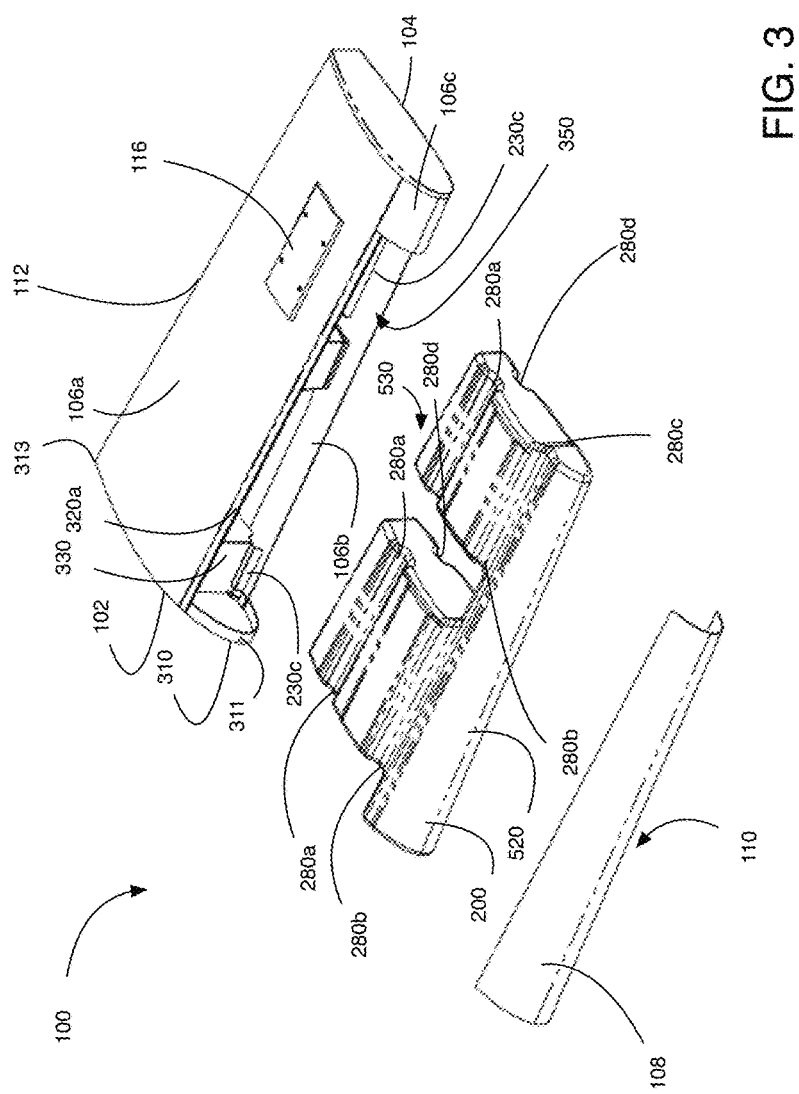

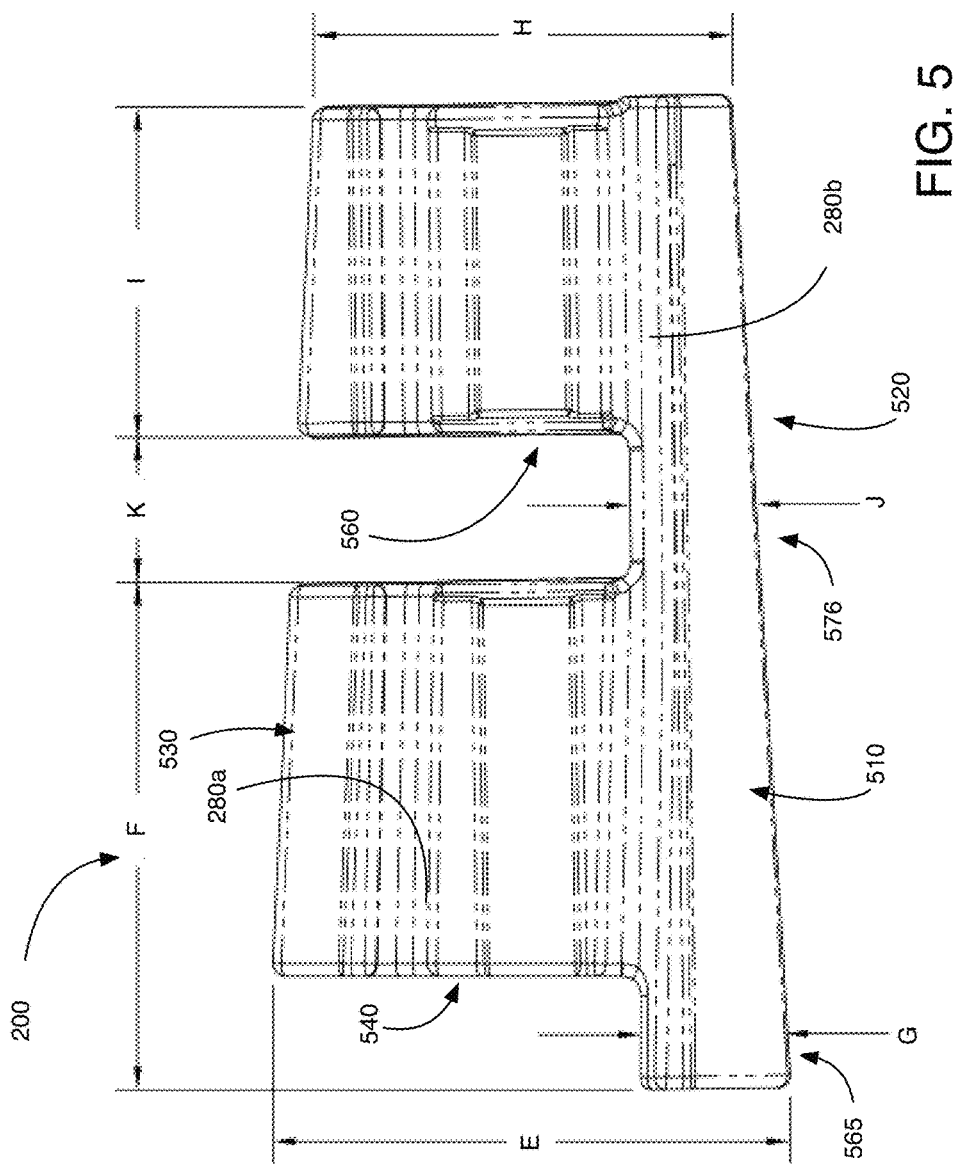

SYSTEM AND METHOD FOR IMPROVING FUEL STORAGE WITHIN A WING OF AN AIRCRAFT

PRIORITY AND RELATED APPLICATIONS STATEMENT

This patent application claims priority under 35 U.S.C. §119(e) to U.S. Provisional Patent Application Ser. No. 62/053,717 filed on Sep. 22, 2014, entitled, "SYSTEM AND METHOD FOR IMPROVING FUEL STORAGE WITHIN A WING OF AN AIRCRAFT," the entire contents of which are hereby incorporated by reference.

DESCRIPTION OF THE RELATED ART

Traditional aircraft wing structures use multi spar construction running vertically spanwise (root to tip) below a wing skin to provide torsional stiffness to the wing. Moreover, traditional aircraft wing structures may also use multi rib construction running cordwise (forward to trailing) for additional stiffness against strain. Although this configuration may afford certain structural benefits to the wing, it also results in numerous separated internal spaces within the wing. These numerous internal spaces make the wing less useful.

As one example, the storage of fuel within a traditional aircraft wing structure is typically accomplished either by using the wing itself as a fuel barrier (wet wing construction) or by inserting a flexible fuel bladder into the wing's available internal space. In either configuration, traditional multi spar and/or rib construction takes up the wing's available internal space. Moreover, inserting a fuel bladder between the spars and ribs presents numerous challenges, including decreased fuel capacity and more complicated interconnect plumbing.

Smaller wings, such as those that provide flight stability in helicopters, for example, are especially susceptible to the negative effects of traditional spar/rib wings. More specifically, smaller wings inherently have less available internal space between the spars and ribs, so the storage of fuel within them is typically limited to wet wing construction. Wet wing construction requires careful sealing of all joints and fasteners in the fuel tank boundary resulting in numerous possible leakage points. Moreover, wet wings are neither self-sealing nor crush resistant.

There is, therefore, a need in the art for a system and method for improving fuel storage within the wing of an aircraft.

SUMMARY OF THE DISCLOSURE

Briefly, the present disclosure is related to a system and method for improving fuel storage within the wing of an aircraft. In one exemplary embodiment of the system and method, one important aspect is the elimination of the traditional spars and ribs, and any spanwise and cordwise connecting vertical webs, within the wing. Instead, the wing comprises a plurality of modified flared spars, each having a length defined by an angled hat section, to help form a reinforced wing structure. The modified flared spars are engaged to the upper or lower structural wing skin, or to any other internal component of the wing, via engagement flanges.

In another exemplary embodiment, the modified flared spars may each comprise one or more lengths defined by a specialized section and configured to accommodate a portion of a box section/housing, or any other internal component of the wing. For example, the specialized section may be similar to the angled hat section on one side, and a folded engagement portion on the opposite side.

In another exemplary embodiment of the system and method, another important aspect is the formation of a reinforced wing structure, configured to receive a contiguous fuel bladder of any size/type. The fuel bladder may be installed and removed via a removable leading edge of the win.

In another exemplary embodiment, the fuel bladder for the wing may comprise a fabric coated or impregnated with an elastomeric material that may include a polyurethane dispersion layer combined with a sealant. More specifically, the polyurethane dispersion layer of the fuel bladder may generally comprise an elastomeric material dispersed or dissolved in a liquid medium, such as, but not limited to, water and other materials described in greater detail herein.

Because the fuel bladder may be made from flexible materials, when the bladder is empty, it may be pushed/flexed into the wing to conform to the internal space. The outer geometry of the fuel bladder may substantially mirror the geometry of the inner surface of the wing. The flexible fuel bladder, while not collapsible under its own weight, may be forcibly compressed by an external force. When the external forces are removed, the fuel bladder may return to its original shape.

In another exemplary embodiment, when the fuel bladder is inserted into the wing, the section of the fuel bladder adjacent to the removable leading edge may comprise a substantially flat or planar surface relative to the curved shape of the removable leading edge. Similarly, a section of the fuel bladder nearest the trailing end/the wing vertex may end/terminate just prior, leaving an unfilled space accessible by filler ports.

With this inventive method and system, greater volume within the wing is available for fuel storage compared to conventional wing designs. Ease of removal and replacement of the fuel bladder is greatly improved. There is much less opportunity for fuel leakage since the bladder is contiguous and requires fewer fittings and connections that are common with both the normal aviation wing and the wet wing construction. Finally, the crashworthiness of the aircraft is greatly enhanced over conventional wet wing constructions.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 3 is a perspective tip side view of the wing of FIG. 1F with the exploded removable forward wall and also with an exploded exemplary embodiment of a fuel bladder;

FIG. 5 is a top side view of the exploded fuel bladder of FIG. 3;

DETAILED DESCRIPTION

The term "exemplary" is used herein to mean "serving as an example, instance, or illustration." Any aspect described herein as "exemplary" is not necessarily to be construed as preferred or advantageous over other aspects.

Figure 1A:
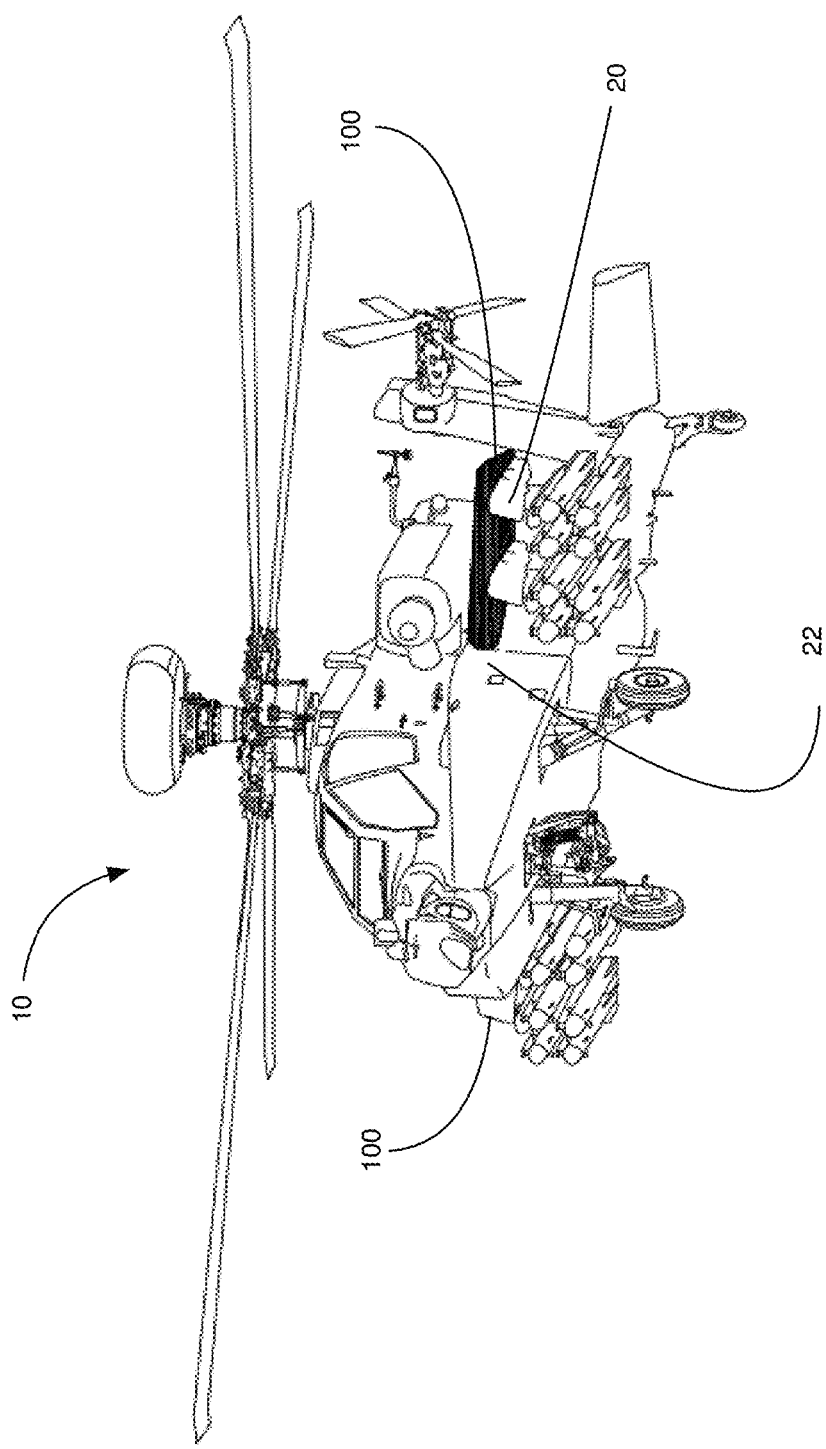
FIG. 1A is a perspective left side view of one exemplary embodiment of an aircraft comprising one exemplary embodiment of a fully assembled wing of the present disclosure.

Referring now to the drawings, wherein the showings are for purposes of illustrating certain exemplary embodiments of the present disclosure only, and not for purposes of limiting the same, FIG. 1A is a perspective left side view of one exemplary embodiment of an aircraft comprising one exemplary embodiment of a fully assembled wing of the present disclosure. More specifically, aircraft 10, an exemplary Boeing™ AH-64 Apache Helicopter, comprises a fully assembled wing 100 of the present disclosure. The wing 100 carries and supports an exemplary embodiment of a payload 20 comprising a standard military ordinance.

The aircraft 10 may be any aircraft type (e.g., military jets, commercial airplanes, helicopters, private/personal aircrafts, etc.) that would benefit from a reinforced wing structure 100 configured to receive a contiguous fuel bladder of any size/type. Consequently, the wing 100 may take various shapes, sizes, and configurations depending on the type of aircraft 10, and on the function of the wing 100 itself. For example, the wing 100 may be a flight wing for a military jet (having an increased dihedral and an aft/trailing end defining a tapered wing vertex for more efficient lift, for example), or the wing 100 may be a stub-wing for a helicopter as in FIG. 1A (having a more short/stout configuration and a less curved profile due to a planar aft wall, for example). One of ordinary skill in the art understands that regardless of the specific features of a specific type of wing, the present disclosure provides various inventive aspects and elements that are applicable to various disparate circumstances.

Figure 1B:
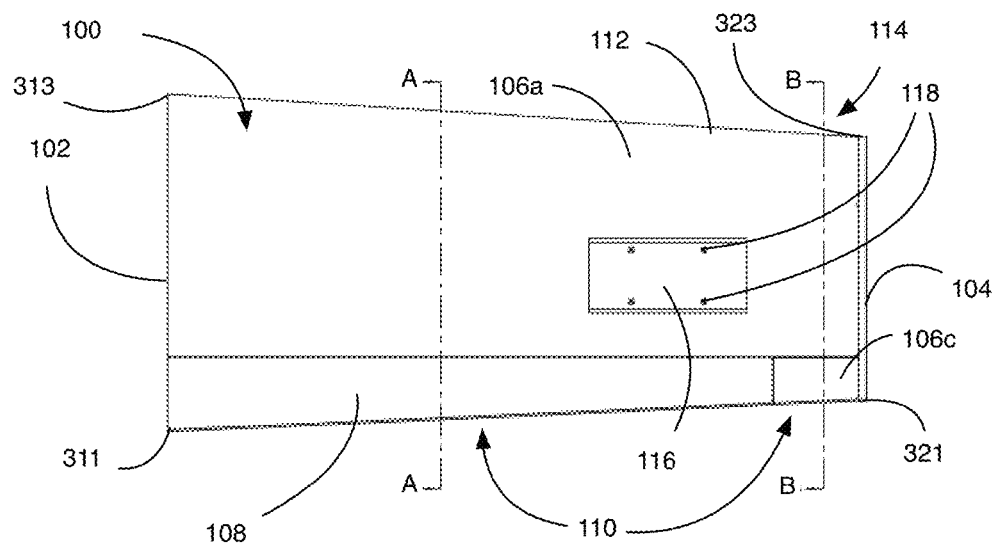
FIG. 1B is a top side view of the fully assembled wing of FIG. 1A.

Referring now to FIG. 1B, FIG. 1B is a top side view of the fully assembled wing of FIG. 1A. The exemplary embodiment illustrated in FIG. 1B is similar to the exemplary embodiments illustrated in FIG. 1A; therefore, only the differences between these exemplary embodiments are described.

The wing 100 is a wing structure that functions to receive one exemplary embodiment of a contiguous fuel bladder 200 (best seen in FIG. 2F; described in greater detail herein). The wing 100 comprises one exemplary embodiment of a root wall 102, a wing tip wall 104, wing skin(s)/structural skin(s) 106, a leading edge 110, a trailing end 114, and an access plate 116. Section A-A and Section B-B of FIGS. 1B and 1E are further illustrated in FIG. 6A and FIG. 6B. One of ordinary skill in the art understands that the wing 100 may comprise various other external or internal wing components such as other access plates 116, and other payloads 20 (best seen in FIG. 1A, for example) that may include, but are not limited to, lights, fins, rudders, elevators, stabilizers, flaps, ailerons, trim tabs, etc.

More specifically, the root wall 102 is a wing component configured to engage with the fuselage 22 of the aircraft 10 when the wing 100 is fully assembled and attached. As such, the root wall 102 may match the contours and surface features of the fuselage 22 along the area of engagement with the aircraft 10 such that any engagement is flush/near-flush, and such that the electrical and mechanical systems of the aircraft 10 may be communicatively coupled to any wing component (such as the payload 20, for example) through the fuselage 22 and into the wing 100. Moreover, the root wall 102 is also a wing component configured to at least partially receive and support certain other structural components of the wing 100 (described in greater detail herein) such as the wing skin 106, a removable forward wall 108 (described in greater detail herein), an aft wall 112 (described in greater detail herein), flared spars 230 (best seen in FIGS. 4B and 6A; described in greater detail herein), internal vertical wing walls 330 (best seen in FIG. 4B; described in greater detail herein), etc.

Furthermore, in the exemplary embodiment of FIGS. 1A-1F, the root wall 102 defines one exemplary embodiment of a root wall opening(s) 312 (best seen in FIG. 4B) that extends through its planar surface. When the fully assembled wing 100 is engaged to the fuselage 22 of the aircraft 10, the root wall opening(s) 312 lines up with any complementary fuselage opening(s) on the aircraft 10. As such, the root wall opening(s) 312 is/are configured to at least partially facilitate the communicative coupling of any electrical or mechanical systems of the aircraft 10 with any wing component(s). For example, in one exemplary embodiment, the root wall opening 312 may facilitate the communicative coupling of the aircraft 10 fuel pump system with the fuel bladder 200.

Furthermore, in the exemplary embodiment of FIGS. 1A-1B, an internal cavity 350 defined within the wing 100

(best seen in FIG. 3 described in greater detail herein) may be accessed via one exemplary embodiment of the access plate 116 covering an aperture through the top portion of wing skin(s)/structural skin(s) 106a. One of ordinary skill in the art understands that the access plate 116 may be engaged to the wing 100 via fasteners 118, such as screws. However, other fasteners may be employed. Other fasteners may include, but are not limited to, rivets, nails, nuts and bolts, adhesives, welds, and the like.

Furthermore, in the exemplary embodiment of FIGS. 1A-1B, the root wall 102 is substantially planar and configured to engage up against the fuselage 22 of the aircraft 10 (best seen in FIG. 1E) such that the fully assembled wing 100 extends perpendicularly, laterally away from the fuselage 22. Moreover, the root wall 102 has one exemplary embodiment of a curved front end 311 proximate to the leading edge 110 (best seen in FIG. 1E) of the fully assembled and attached wing 100. Moreover, the root wall 102 has one exemplary embodiment of a flat or substantially planar back end 313 (relative to the curved front leading edge 311). The flat back end 313 is proximate to the trailing end 114 of the fully assembled and attached wing 100.

Furthermore, in the exemplary embodiment of FIGS. 1A-1B, the tip wall 104 of the wing 100 is a wing component situated opposite the root wall 102. When the fully assembled wing 100 is engaged to the fuselage 22 of the aircraft 10, the tip wall 104 terminates the wing 100. The tip wall 104, like the root wall 104, is substantially planar and has a curved front end 321 proximate to the leading edge 110 (best seen in FIG. 1E) of the fully assembled and attached wing 100. Moreover, the tip wall 104 has a similar flat or substantially planar back end 323 as the root wall 102. The flat or substantially planar back end 323 of the tip wall 104 is proximate to the trailing end 114 (best seen in FIG. 1E) of the fully assembled and attached wing 100. Moreover, the tip wall 104 lies parallel to the root wall 102 and the tip wall 104 is slightly smaller in scale than the root wall 102. One of ordinary skill in the arts understands that this stub-wing helicopter configuration is but one non-limiting embodiment of the system and method of the present of disclosure.

Furthermore, in the exemplary embodiment of FIGS. 1A-1B, the wing skin(s)/structural skin(s) 106 of the wing 100 is a wing component that extends externally around the wing 100 structure. The wing skin(s)/structural skin(s) 106 may comprise a plurality of individual panels, sheets, layers, etc. When the fully assembled wing 100 is engaged to the fuselage 22 of the aircraft 10, the wing skin(s)/structural skin(s) 106 operates as a tensile/torsional shell reinforced, at least in part, by internal flared spars 230 (best seen in FIG. 2A; described in greater detail herein) running spanwise. Even though the wing 100 lacks any ribs running cordwise or any vertical spars, the wing skin(s)/structural skin(s) 106 has/have sufficient torsional stiffness to support the extended structure.

Furthermore, in the exemplary embodiment of FIGS. 1A-1B, the wing skin(s)/structural skin(s) 106 may be designed to react the typical flight and service loads of the host aircraft 10 without any loss of operation or damage to the wing structure 100. The reacted loading shall encompass loading and imparted forces due to wing payload 20 such as weapon platforms, external fuel tanks, camera pods, and the like. Typical aircraft typical flight and service reaction loading is 5 g's (5 times the acceleration due to gravity). In the event of a crash, the wing structure 100 completely contains internal fuel to a loading factor between 5 and 20 g's.

Furthermore, in the exemplary embodiment of FIGS. 1A-1B, the wing skin(s)/structural skin(s) 106 comprises one exemplary embodiment of a top component 106a, a bottom component 106b (best seen in FIG. 1C), a supplemental component 106c and an access plate 116. The wing skin(s)/structural skin(s) 106 may also comprise carbon fibers, boron, para-aramid, glass, and resin materials such as epoxies, vinyl esters, polyesters, and phenol formaldehyde. In one exemplary embodiment, the wing skin 106 may comprise a composite material having carbon cloth.

In the exemplary embodiment of FIGS. 1A-1B, the wing skin(s)/structural skin(s) 106 may also provide structural integrity to the wing structure 100 through the use of a combination of unidirectional fibers, woven cloth, and/or structural compression molded composites bonded together in a resin matrix. The wing skin 106 may comprise unidirectional fibers traversing spanwise in order to provide lateral strength to the wing structure 100 and to support additional payload 20. The wing skin 106 outer-most layers may be constructed of a woven cloth for added durability, impact resistance, and reparability/maintainability. The wing skin 106 may incorporate transitional regions that permit attachment to non-composite structural members for support of payload 20 or the wing structure 100 itself. Non-composite structural members may be constructed of steel, aluminum, Inconel, glass infused nylon or other material known to one of ordinary skill in the art.

In the exemplary embodiment of FIGS. 1A-1B, the top component 106a and the bottom component 106b extend from the root wall 102 to the tip wall 104. The supplemental component 106c is one exemplary embodiment of a curved portion of the leading edge 110 proximate the tip wall 104 (best seen in FIG. 1E; described in greater detail herein). One of ordinary skill in the art understands that this three-piece configuration for a stub-wing construction is but one non-limiting embodiment of the wing skin(s)/structural skin(s) 106. In other words, a single-piece or two-piece, or four-piece configurations (not illustrated) are possible and are within the scope of this disclosure.

Furthermore, in the exemplary embodiment of FIGS. 1A-1B, the leading edge 110 and the trailing end 114 of the fully assembled and attached wing 100 are portions of the wing 100 naturally understood by one of ordinary skill in the art. The contours and geometry of the wing 100 structure between the leading edge 110, the trailing end 114, and the tip wall 104 depends entirely on the wing type. For example, the wing 100 may be a flight wing for a military jet having an increased dihedral and a trailing end 114 defining a tapered wing vertex. The wing 100 may also be a stub-wing having minimal dihedral, a short/stout configuration, and a less curved profile due to a planar aft wall 112.

As illustrated in the exemplary embodiment of FIGS. 1A-1B, the leading edge 110 comprises one exemplary embodiment of a removable forward wall 108 and the supplemental portion of wing skin(s)/structural skin(s) 106c (best seen in FIG. 1E). The removable forward wall 108 and the supplemental portion of wing skin(s)/structural skin(s) 106c, one adjacent to the other between the root wall 102 and the tip wall 104, define one exemplary embodiment of a curved leading edge 110 for the wing 100. As such, when the fully assembled wing 100 is engaged to the fuselage 22 of the aircraft 10, the removable forward wall 108 forms a flush/near-flush junction between it and the skin(s)/structural skin(s) 106, and the root wall 102 (best seen in FIG. 1E; described in greater detail herein).

As further illustrated in the exemplary embodiment of FIGS. 1A-1B, the removable forward wall 108 may be constructed with composite materials like the wing skin 106 of the wing 100. The composite materials for the removable forward wall 108 may be identical or different compared to the composite materials for the wing skin 106, such as carbon fibers, boron, para-aramid, glass, and resin materials such as epoxies, vinyl esters, polyesters, and phenol formaldehyde. One having ordinary skill in the art understands that the curved leading edge 110 is not the only portion of the wing 100 structure wherein the removable access wall 108 may be situated.

Figure 1C:
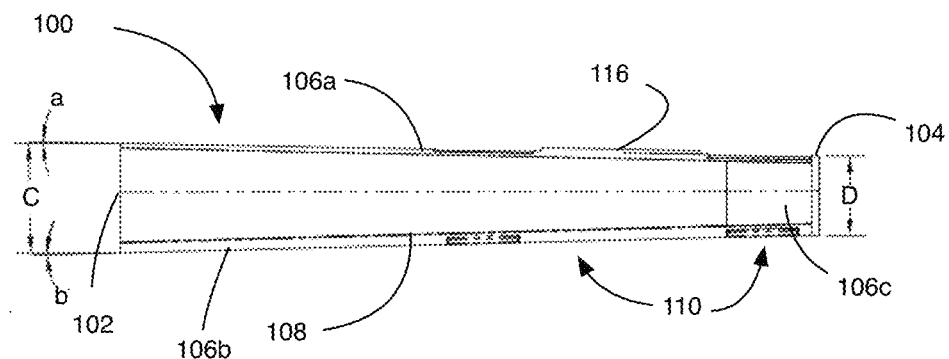
FIG. 1C is a forward side view of the fully assembled wing of FIG. 1A.

Referring now to FIG. 1C, FIG. 1C is a forward side view of the fully assembled wing of FIG. 1A. The exemplary embodiment illustrated in FIG. 1C is similar to the exemplary embodiments illustrated in FIGS. 1A and 1B; therefore, only the differences between these exemplary embodiments are described.

The curved leading edge 110 of the wing 100 has a height C of between about 8.00 and about 16.00, and preferably about 11.40 inches proximate to the root wall 102. The curved leading edge 110 of the wing 100 also has a height D of between about 6.00 inches to about 10.00 inches, and preferably about 8.00 inches proximate to the tip wall 104. When the fully assembled wing 100 is engaged to the fuselage 22 of the aircraft 10, the top and bottom edge of the curved leading edge 110, extending between the root wall 102 and the tip wall 104, each define a slope angle a and b, respectively, of between about 0.50 degree and about 3.00 degrees, and preferably about 1.00 degree. One of ordinary skill in the art understands that this particular curved configuration for a stub-wing construction is but one non-limiting embodiment of the leading edge 110. Further, other dimensions greater or smaller than those ranges described are possible and are within the scope of this disclosure.

Figure 1D:
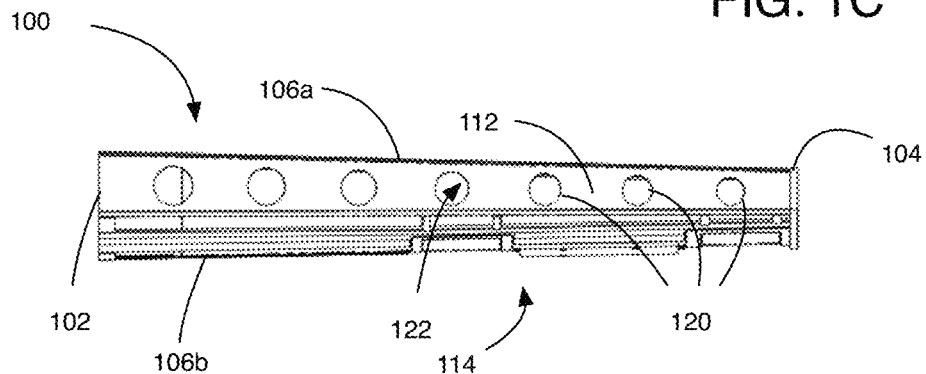
FIG. 1D is an aft side view of the fully assembled wing of FIG. 1A.
Figure 1E:
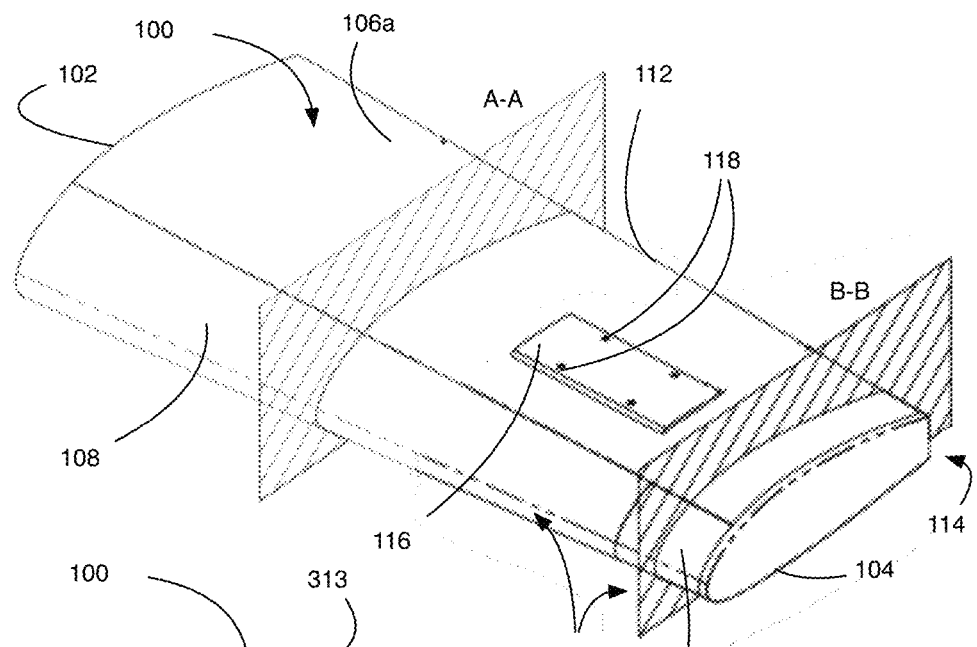
FIG. 1E is a perspective tip side view of the fully assembled wing of FIG. 1A.

Referring now to FIG. 1D, FIG. 1D is an aft side view of the fully assembled wing of FIG. 1A. The exemplary embodiment illustrated in FIG. 1D is similar to the exemplary embodiments illustrated in FIGS. 1A-1C; therefore, only the differences between these exemplary embodiments are described.

The trailing end 114 comprises one exemplary embodiment of an aft wall 112. The aft wall 112 defines one exemplary embodiment of a planar trailing end 114 for the wing 100. As such, when the fully assembled wing 100 is engaged to the fuselage 22 of the aircraft 10, the aft wall 112 forms a flush/near-flush junction between it and the skin(s)/structural skin(s) 106, and the root wall 102. One of ordinary skill in the art understands that the aft wall 112 may not necessarily provide any structural support for the overall wing 100 structure. Instead, the aft wall 112 may simply enclose one side of an internal cavity 122 defined by the wing 100 structure (best seen in FIG. 6A; described in greater detail herein).

Furthermore, in the exemplary embodiment of FIGS. 1A-1D, like the curved leading edge 110 of the wing 100 as illustrated in FIG. 1C and described above, the planar trailing end 114 has a height of between about 8.00 inches to about 15.00 inches, and preferably about 11.40 inches, proximate to the root wall 102, and a height of between about 6.00 inches to about 10.00 inches, and preferably about 8.00 inches proximate to the tip wall 104. Moreover, when the fully assembled wing 100 is engaged to the fuselage 22 of the aircraft 10, the top and bottom edge of the planar aft wall 112, extending between the root wall 102 and the tip wall 104, each define a slope angle of between about 0.75 degrees to about 1.25 degrees, and preferably about 1.00 degree. One of ordinary skill in the art understands that this particular curved configuration for a stub-wing construction is but one non-limiting embodiment of the trailing end 114.

Furthermore, in the exemplary embodiment of FIGS. 1A-1E, the planar trailing end 114 defines various openings 120 that extend through its planar surface. When the fully assembled wing 100 is engaged to the fuselage 22 of the aircraft 10, the aft wall openings 120 access the trailing end internal cavity 122 between the aft wall 112 and the fuel bladder 200 (best seen in FIG. 6A; described in greater detail herein). As such, in one exemplary embodiment, the aft wall openings 120 are configured to at least partially facilitate accessing the internal cavity 122—into which the electrical or mechanical systems of the aircraft 10 may extend. For example, in one exemplary embodiment, the aft wall openings 120 may facilitate filling the fuel bladder 200 (see FIG. 1F) without having to remove the fuel bladder 200 from the wing 100 structure.

Figure 6A:
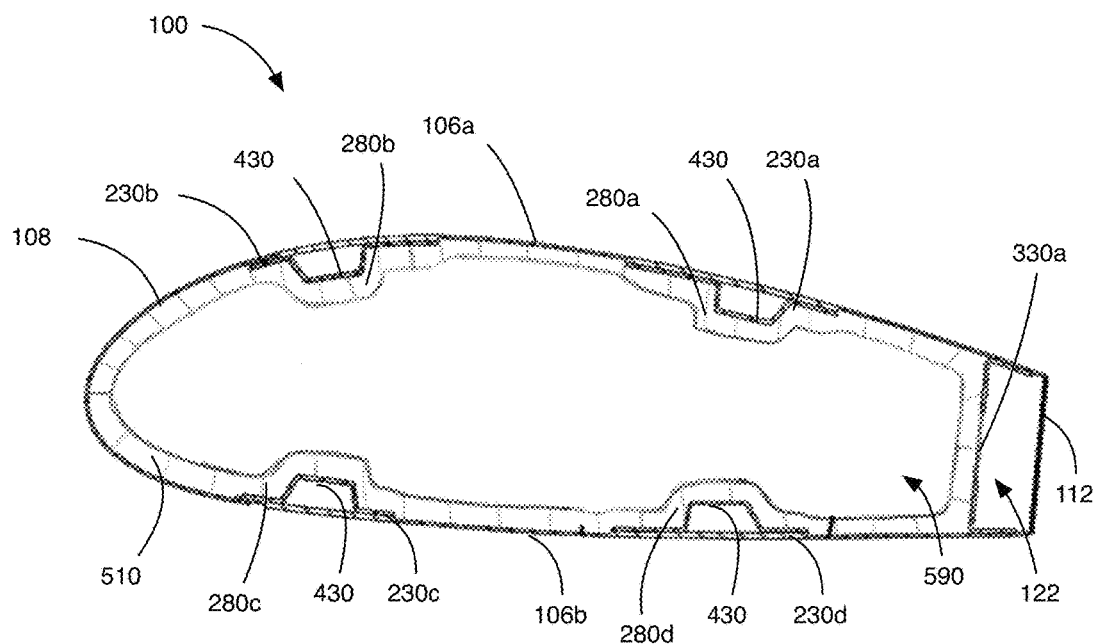
FIG. 6A is a sectional view of the fully assembled wing along section A-A of FIG. 1B and FIG. 1E.
Figure 6B:
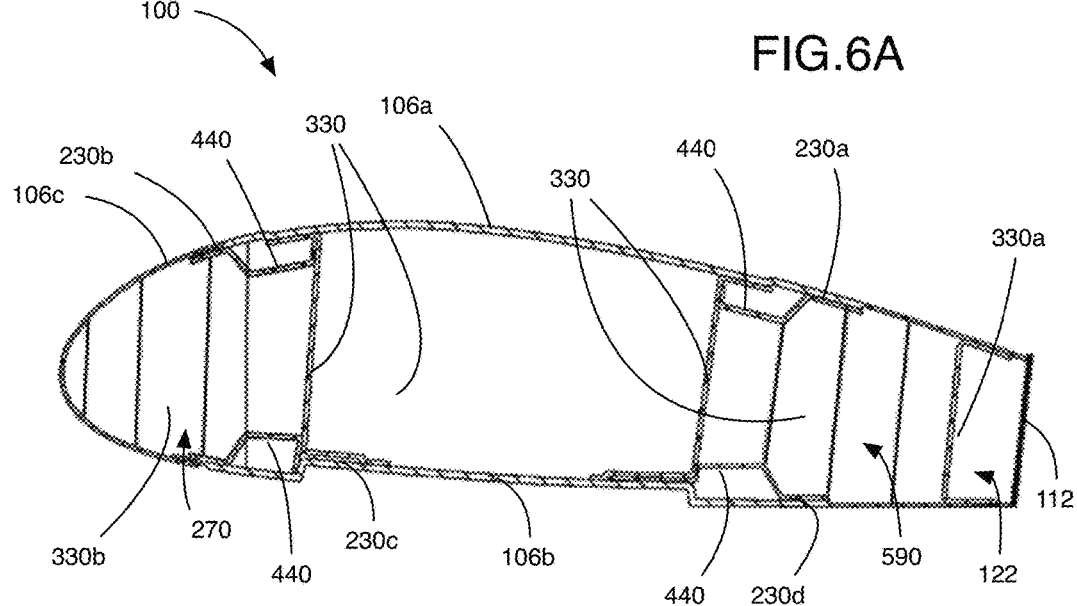
FIG. 6B is a sectional view of the fully assembled wing along section B-B of FIG. 1B and FIG. 1E.

Referring now to FIG. 1E, FIG. 1E is a perspective tip side view of the fully assembled wing of FIG. 1A. The exemplary embodiment illustrated in FIG. 1E is similar to the exemplary embodiments illustrated in FIGS. 1A-1D. Like FIG. 1B, Section A-A and Section B-B of FIG. 1E are illustrated in FIG. 6A and FIG. 6B. Each of the elements of FIG. 1E have been described above.

Figure 1F:
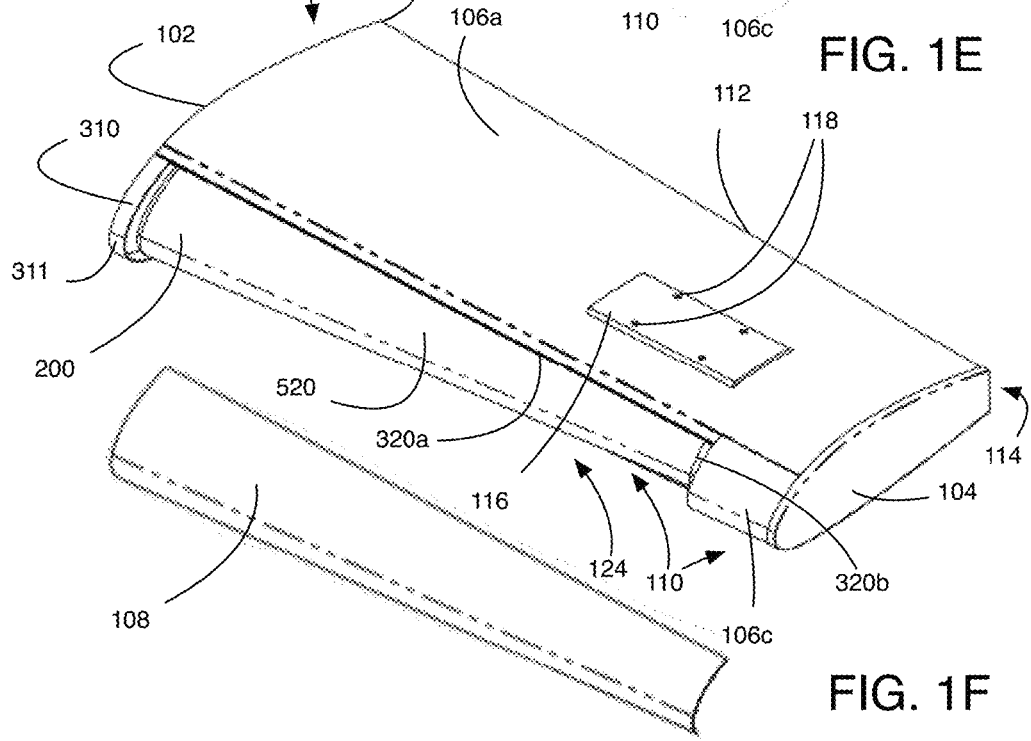
FIG. 1F is a perspective tip side view of the wing of FIG. 1A with an exploded exemplary embodiment of a removable forward wall.

Referring now to FIG. 1F, FIG. 1F is a perspective tip wall view of the wing of FIG. 1A with an exploded exemplary embodiment of a removable forward wall 108. The exemplary embodiment illustrated in FIG. 1F is similar to the exemplary embodiments illustrated in FIGS. 1A-1E; therefore, only the differences between these exemplary embodiments are described.

The root wall 102 has one exemplary embodiment of a root wall engagement flange 310 (best seen in FIG. 4B) around its periphery. When the fully assembled wing 100 is engaged to the fuselage 22 of the aircraft 10, the root wall engagement flange 310 extends perpendicularly, laterally away from the fuselage 22. As such, the root wall engagement flange 310 is configured to at least partially facilitate the reception and support of the other structural components of the wing 100 (i.e. the removable forward wall 108, for example).

More specifically, in the exemplary embodiment of FIGS. 1A-1F, when the fully assembled wing 100 is engaged to the fuselage 22 of the aircraft 10, the removable forward wall 108 covers one exemplary embodiment of an opening 124 that accesses the internal cavity 350 (see FIG. 3) within the wing 100—wherein the fuel bladder 200 is situated (described in greater detail herein). As such, the periphery of the removable forward wall 108 may couple to the wing 100 structure along the root wall engagement flange 310 (see FIG. 3) and the one exemplary embodiment of the wing skin engagement flange(s) 320a, b, for example, such that any engagement is flush/near-flush.

Furthermore, in the exemplary embodiment of FIGS. 1A-1F, the removable forward wall 108 may be engaged to the root wall engagement flange 310 and the wing skin engagement flange 320 via one or more fasteners (not illustrated), such as screws. However, other fasteners may be employed. Other fasteners may include, but are not limited to, rivets, nails, nuts and bolts, adhesives, welds, and the like.

Figure 2A:
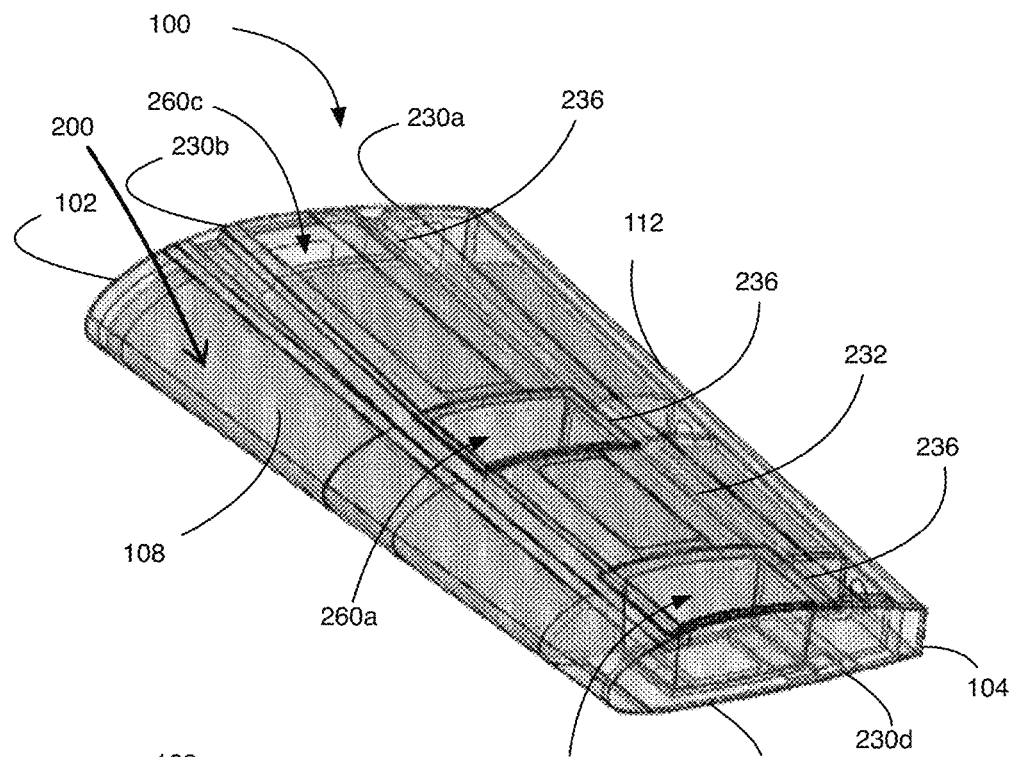
FIG. 2A is a wire frame view of the fully assembled wing of FIG. 1E.

Referring now to FIG. 2A, FIG. 2A is a wire frame view of the fully assembled wing of FIG. 1E. The exemplary embodiment illustrated in FIG. 2A is similar to the exemplary embodiments illustrated in FIGS. 1A-1F; therefore, only the differences between these exemplary embodiments are described.

Figure 6C:
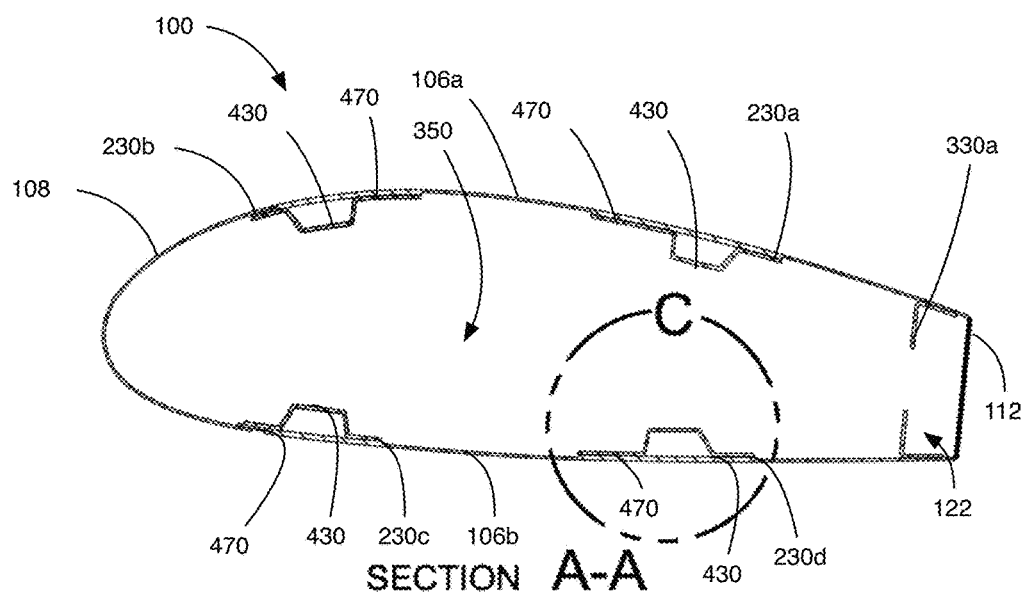
FIG. 6C is a sectional view of the wing along section A-A of FIG. 1B and FIG. 1E with the exemplary embodiment of the fuel bladder removed.
Figure 6D:
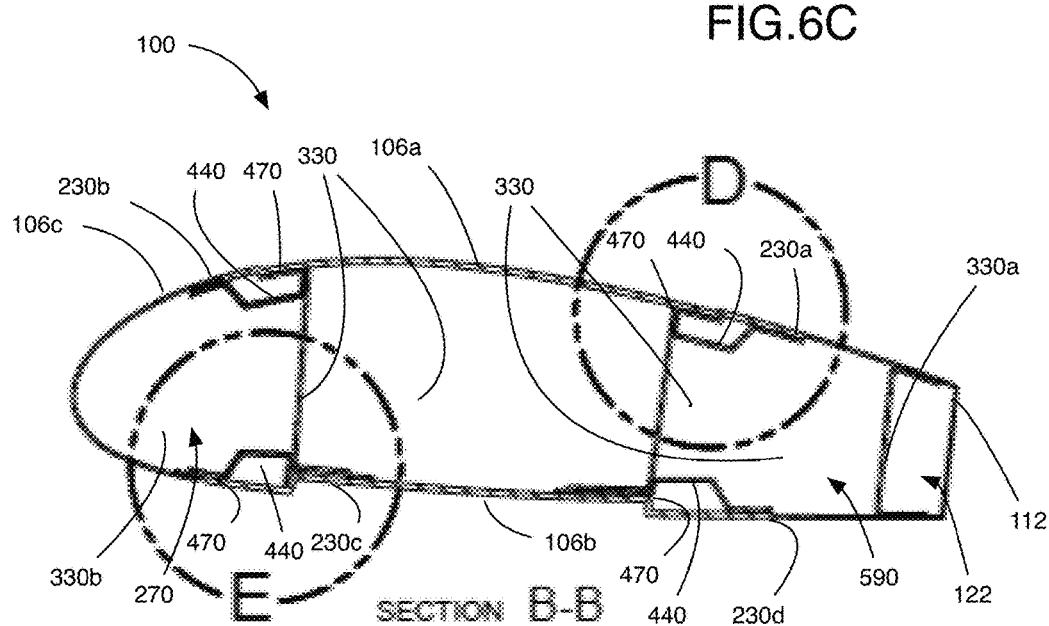
FIG. 6D is a sectional view of the wing along section B-B of FIG. 1B and FIG. 1E with the exemplary embodiment of the fuel bladder removed.
Figure 6E:
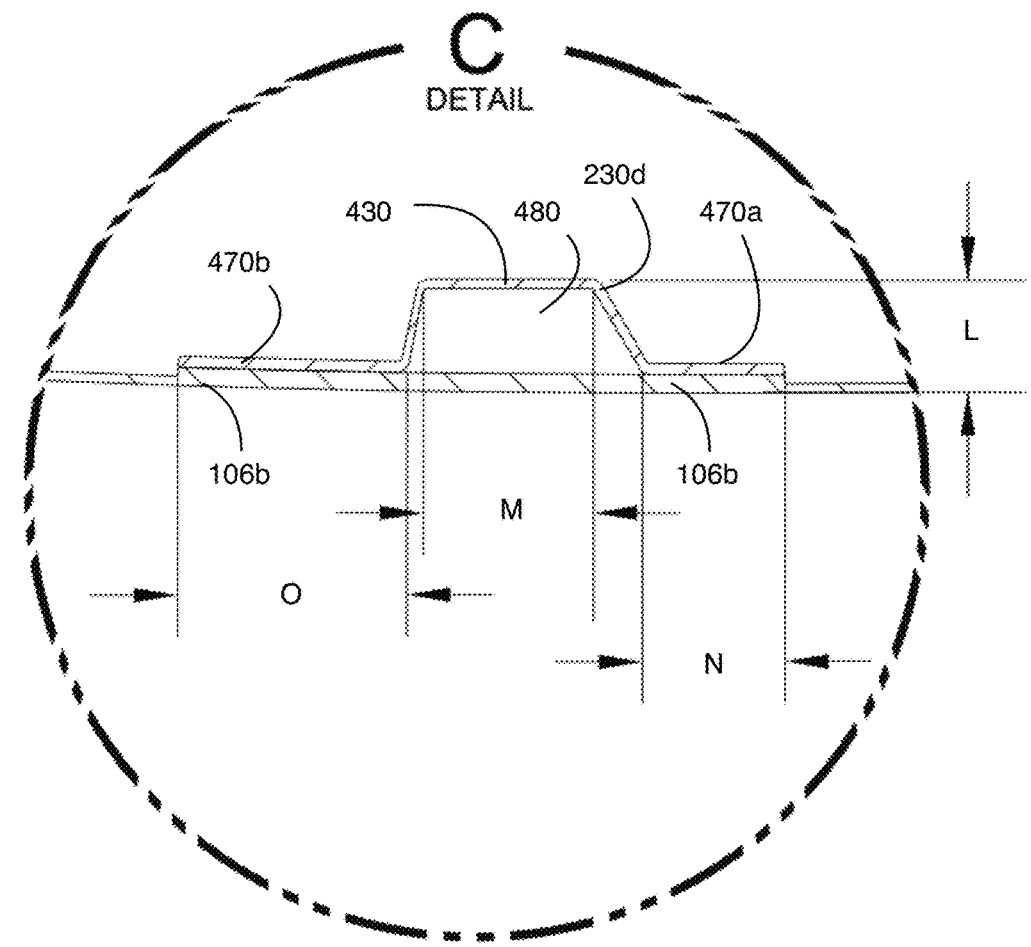
FIG. 6E is a perspective bottom side view of detail C of FIG. 6C.

As described previously herein, the fully assembled wing 100 also comprises flared spars 230 each having a first length 232 defined by an angled hat section 430 (best seen in FIG. 6E; described in greater detail herein). The flared spars 230 are engaged spanwise along the inner surface of the wing skin 106, via spar engagement flange(s) 470 (best seen in FIG. 6E; described in greater detail herein), to form the wing 100 structure. Moreover, the flared spars 230 may each comprise one or more second lengths 236 defined by a box/housing-coupling section 440 that is slightly distinct from the angled hat section 430 configuration (best seen in FIG. 6F-6G; described in greater detail herein). When the fully assembled wing 100 is engaged to the fuselage 22 of the aircraft 10, the wing skin(s)/structural skin(s) 106 operates as a tensile shell reinforced, at least in part, by the internal flared spars 230.

In the exemplary embodiment of FIGS. 1 and 2A, the wing 100 comprises two exemplary embodiments of flared spars 230 engaged spanwise along the inner surface of the top wing skin component 106a, and two exemplary embodiments of flared spars 230 engaged spanwise along the inner surface of the bottom wing skin component 106b. The wing 100 also comprises three exemplary embodiments of box sections/housings 260a, b, c (also referred to as non-fuel utility housings) that are made up of exemplary embodiments of vertical wing walls 330 (best seen in FIG. 4B; described in greater detail herein). The one or more second lengths 236 of the flared spars 230 accommodate the box sections/housings 260, or any other internal component of the wing 100, that are situated along the path of the flared spars 230 (best seen in FIG. 6F-6G; described in greater detail herein).

While box sections/non-fuel utility housings 260 are illustrated as having a geometry of a rectilinear/rectangular box, other geometric shapes for box sections/housings 260 are possible and are within the scope of this disclosure. Other geometries for box sections/housings 260 include, but are not limited to, cylindrical, pentagonal, octagonal, pyramidal, and other like pologonal geometries (more than four sides) as understood by one of ordinary skill in the art. The function/purpose of box sections/housings 260 may include, but are not limited to, storage volumes/space for cargo, receptacles/regions for equipment such as, but not limited to, landing gear, ordinances, internal wing components including conduits, wiring, electromechanical devices such as pumps, electronics, etc.

Furthermore, in the exemplary embodiment of FIGS. 1 and 2, the flared spars 230 may be constructed with composite materials like the wing skin 106 of the wing 100. The composite materials for the flared spars 230 may be identical or different compared to the composite materials for the wing skin 106, such as carbon fibers, boron, para-aramid, glass, and resin materials such as epoxies, vinyl esters, polyesters, and phenol formaldehyde. In one exemplary embodiment, because the flared spars 230 are configured to help distribute the load acting on the wing 100, the composite materials for the flared spars 230 may comprise metals that are usually not present, for weight purposes, in the composite material of the wing skin 106 or any other wing component.

Moreover, as the flared spars 230 provide additional loading pathways for the wing 100 structure, the flared spars 230 may be constructed of solid laminate materials in which there is no foam core or Nomex/aluminum honeycomb core. This provides additional stiffness in the lateral direction. In this exemplary embodiment, the shape of the flared spars 230 may be designed to provide the lateral stiffness/strength as well as torsional stiffness not generally incumbent in a wing structure.

Figure 2B:
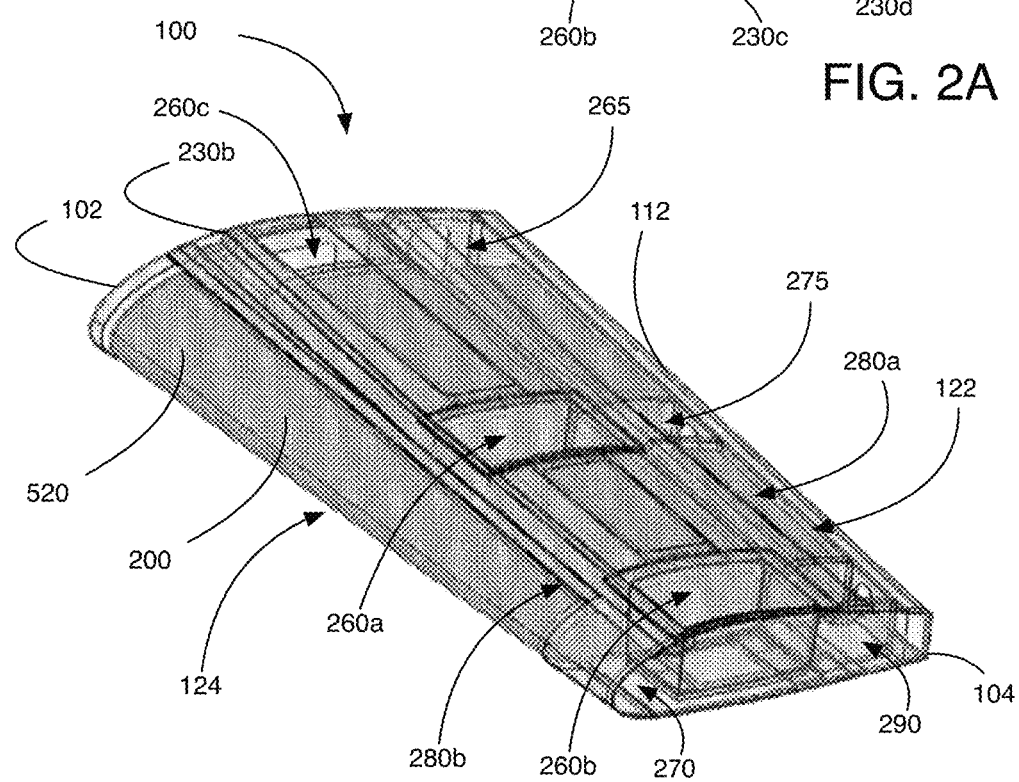
FIG. 2B is a wire frame view of the exploded wing of FIG. 1F.

Referring now to FIG. 2B, FIG. 2B is a wire frame view of the exploded wing of FIG. 1F. The exemplary embodiment illustrated in FIG. 2B is similar to the exemplary embodiments illustrated in FIGS. 1A-2A; therefore, only the differences between these exemplary embodiments are described.

When the fully assembled wing 100 is engaged to the fuselage 22 of the aircraft 10, the wing 100 defines various exemplary embodiments of internal cavities wherein the fuel bladder does not fill the void/internal volume formed by the walls/structures of the wing 100. More specifically, a first internal cavity 265 is defined by the root wall 102, the box section/housing 260c, the fuel bladder 200, the wing skin 106, and the vertical wing wall 330a (best seen in FIG. 6A). The vertical wing wall 330a partially defines a trailing end cavity 122 proximate to the aft wall 112. Moreover, a second internal cavity 270 is defined by the tip wall 104, the box section/housing 260b, the fuel bladder 200, the wing skin 106, and the vertical wing wall 330b (best seen in FIG. 4A). Moreover, the third internal cavity 275 is defined by the vertical wing wall 330a, 330c, and 330d, the box section/housing 260a, and the wing skin 106 (best seen in FIG. 4B). A fourth internal cavity 290 is defined by the tip wall 104, the box section/housing 260b, the wing skin 106, and the vertical wing wall 330e, 330f, and 330a (best seen in FIG. 4B). Additional or fewer internal cavities may be formed and are included within the scope of this disclosure as understood by one of ordinary skill in the art.

Furthermore, in the exemplary embodiment of FIGS. 1 and 2, the wing 100 comprises one exemplary embodiment of a contiguous fuel bladder 200. The fuel bladder 200 is configured to be inserted, via the opening 124, into the fuel bladder cavity 350 (best seen in FIG. 3; described in greater detail herein) of the wing 100 structure. The fuel bladder 200 may comprise a fabric coated or impregnated with an elastomeric material that may include a polyurethane dispersion layer combined with a sealant. More specifically, the polyurethane dispersion layer of the fuel bladder may generally comprise an elastomeric material dispersed or dissolved in a liquid medium, such as, but not limited to, water, as described in further detail in the commonly owned U.S. patent application Ser. No. 13/796,878, filed on Mar. 12, 2013, entitled, "METHOD AND SYSTEM FOR FORMING A SELF-SEALING VOLUME," the entire contents of which are hereby incorporated by reference.

Furthermore, in the exemplary embodiment of FIGS. 1 and 2, the fuel bladder 200 may meet the requirements, alone or in combination with other fuel system components, to qualify as crashworthy and/or crash resistant. One of ordinary skill in the art understands that a crashworthy rating is one that is assigned when a fuel bladder 200 withstands an impact from about 65.00 feet or higher when about 100% full of water and does not have any leaks after such an impact. Moreover, one of ordinary skill in the art understands that a crash resistant rating is one that is assigned when a fuel bladder 200 withstands an impact from about 50.00 feet or higher when about 80% full of water and does not have any leaks after such an impact. Moreover, one of ordinary skill in the art understands that a crashworthy/crash resistant system may be self-sealing.

The fuel bladder 200 described herein may comprise one which may be at least one of four types based on the crashworthy and crash resistant definitions provided above. The fuel bladder 200 may be at least one of: (a) crashworthy and self-sealing; (b) crashworthy and non-self-sealing; (c) crash resistant and self-sealing; and (d) crash resistant and non-self-sealing.

Furthermore, in the exemplary embodiment of FIGS. 1 and 2, when the fuel bladder 200 is empty, it may be pushed/flexed into the wing 100 structure to conform to the fuel bladder cavity 350 (best seen in FIG. 3) defined by the wing 100 structure. The outer geometry of the fuel bladder 200 may substantially mirror the geometry of the inner surface of the wing 100 structure. The fuel bladder 200, while not collapsible under its own weight, may be forcibly compressed by an external force into the wing 100 structure. When the external forces are removed, the fuel bladder 200 may return to its original shape. Moreover, the outer geometry of the fuel bladder 200 may additionally comprise corresponding flared spar-receiving grooves 280 configured to receive the contours of the flared spar 230 when the fuel bladder is received by the fully assembled and attached wing 100 structure.

Furthermore, in the exemplary embodiment of FIGS. 1 and 2, when the fuel bladder 200 is inserted into the wing 100 structure, the section 520 of the fuel bladder 200 adjacent to the curved leading edge 110 may comprise a substantially flat or planar surface relative to the curved shape of the curved leading edge 110. Similarly, a section 530 of the fuel bladder 200 (best seen in FIG. 3) nearest the planar trailing end 114 may end/terminate just prior, leaving an unfilled trailing end cavity 122 between the fuel bladder 200 and the aft wall 112. In one exemplary embodiment, a vertical wing wall 330a (best seen in FIG. 6A) may extend spanwise parallel to the aft wall 112 and provide minimal support for the side of the fuel bladder 200 nearest the planar trailing end 114, and define one side of the trailing end cavity 122.

Referring now to FIG. 3, FIG. 3 is a perspective tip side view of the wing of FIG. 1F with the exploded removable forward wall and also with an exploded fuel bladder. More specifically, the fuel bladder 200 is exploded, via the opening 124, out of the fuel bladder internal cavity 350 defined by the remaining wing 100 structure (wherein the fuel bladder 200 was previously situated in FIG. 1F). The exemplary embodiment illustrated in FIG. 3 is similar to the exemplary embodiments illustrated in FIGS. 1A-2B; therefore, only the differences between these exemplary embodiments are described.

The overall shape, configuration, and outer geometry of the fuel bladder 200 substantially complements the exemplary embodiment of the fuel bladder internal cavity 350 within the wing 100 structure. More specifically, when the fuel bladder 200 is pushed/flexed into the remaining wing 100 structure, the fuel bladder 200 fits/conforms around the limited internal wing components (the vertical wing walls 330 making up the box sections/housings 260, for example). The fuel bladder 200, therefore, leaves only the minimal amount of unused volume within the trailing end cavity 122, the box sections/housings 260, the first internal cavity 265, the second internal cavity 270, the third internal cavity 275, and the fourth internal cavity 290 (best seen in FIG. 2B).

Furthermore, in the exemplary embodiment of FIGS. 1-3, the outer geometry of the fuel bladder 200 defines two flared spar-receiving grooves 280a and 280b along its top side configured to receive the flared spars 230a and 230b respectively (best seen in FIG. 6A). Moreover, the outer geometry of the fuel bladder 200 defines two flared spar-receiving grooves 280c and 280d along its bottom side configured to receive the flared spars 230c and 230d respectively (best seen in FIG. 6A).

Figure 4A:
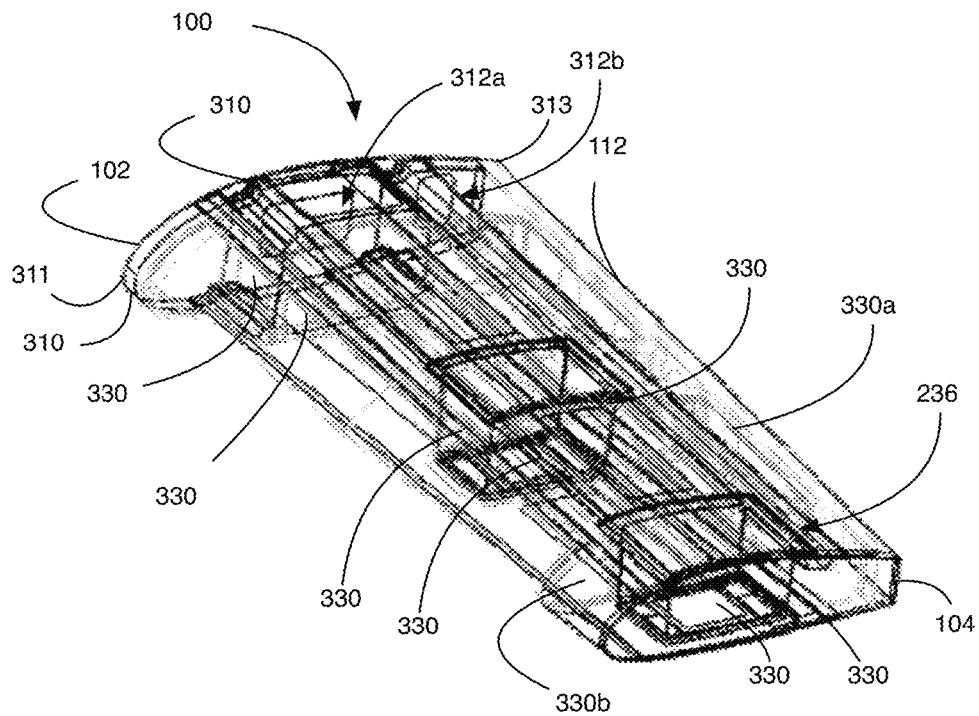
FIG. 4A is an internal wire-frame view of the remaining wing structure of FIG. 3.

Referring now to FIG. 4A, FIG. 4A is a wire-frame view of the remaining wing structure of FIG. 3. The exemplary embodiment illustrated in FIG. 4A is similar to the exemplary embodiments illustrated in FIGS. 1-3; therefore, only the differences between these exemplary embodiments are described.

As described previously herein, when the fully assembled wing 100 is engaged to the fuselage 22 of the aircraft 10, the wing 100 defines various exemplary embodiments of internal cavities wherein the fuel bladder does not fill the void/internal volume formed by the walls/structures of the wing 100. Moreover, a vertical wing wall 330a (best seen in FIG. 6A) extend spanwise parallel to the aft wall 112 and provide minimal support for the fuel bladder 200 nearest the planar trailing end 114, and define one side of the trailing end cavity 122. The first internal cavity 265 is defined by the root wall 102, the box section/housing 260c, the fuel bladder 200, the wing skin 106, and the vertical wing wall 330a (best seen in FIG. 6A). The second internal cavity 270 is defined by the tip wall 104, the box section/housing 260b, the fuel bladder 200, the wing skin 106, and the vertical wing wall 330b (best seen in FIG. 2B). The third internal cavity 275 is defined by the vertical wing wall 330a, 330c, and 330d, the box section/housing 260a, and the wing skin 106 (best seen in FIG. 2B). A fourth internal cavity 290 is defined by the tip wall 104, the box section/housing 260b, the wing skin 106, and the vertical wing wall 330e, 330f, and 330a (best seen in FIG. 2B).

Figure 4B:
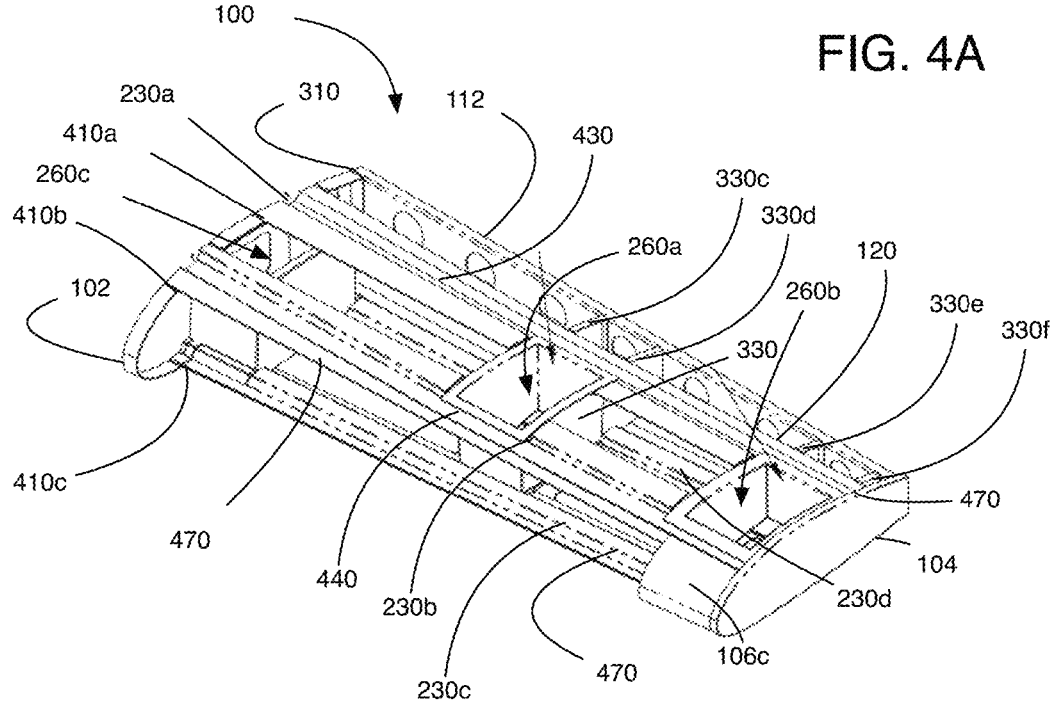
FIG. 4B is a perspective tip side view of the remaining wing structure of FIG. 3 with an exemplary embodiment of a wing skin removed.

Referring now to FIG. 4B, FIG. 4B is a wire-frame view of the remaining wing structure of FIG. 3. The exemplary embodiment illustrated in FIG. 4B is similar to the exemplary embodiments illustrated in FIGS. 1-4A; therefore, only the differences between these exemplary embodiments are described.

Figure 4C:
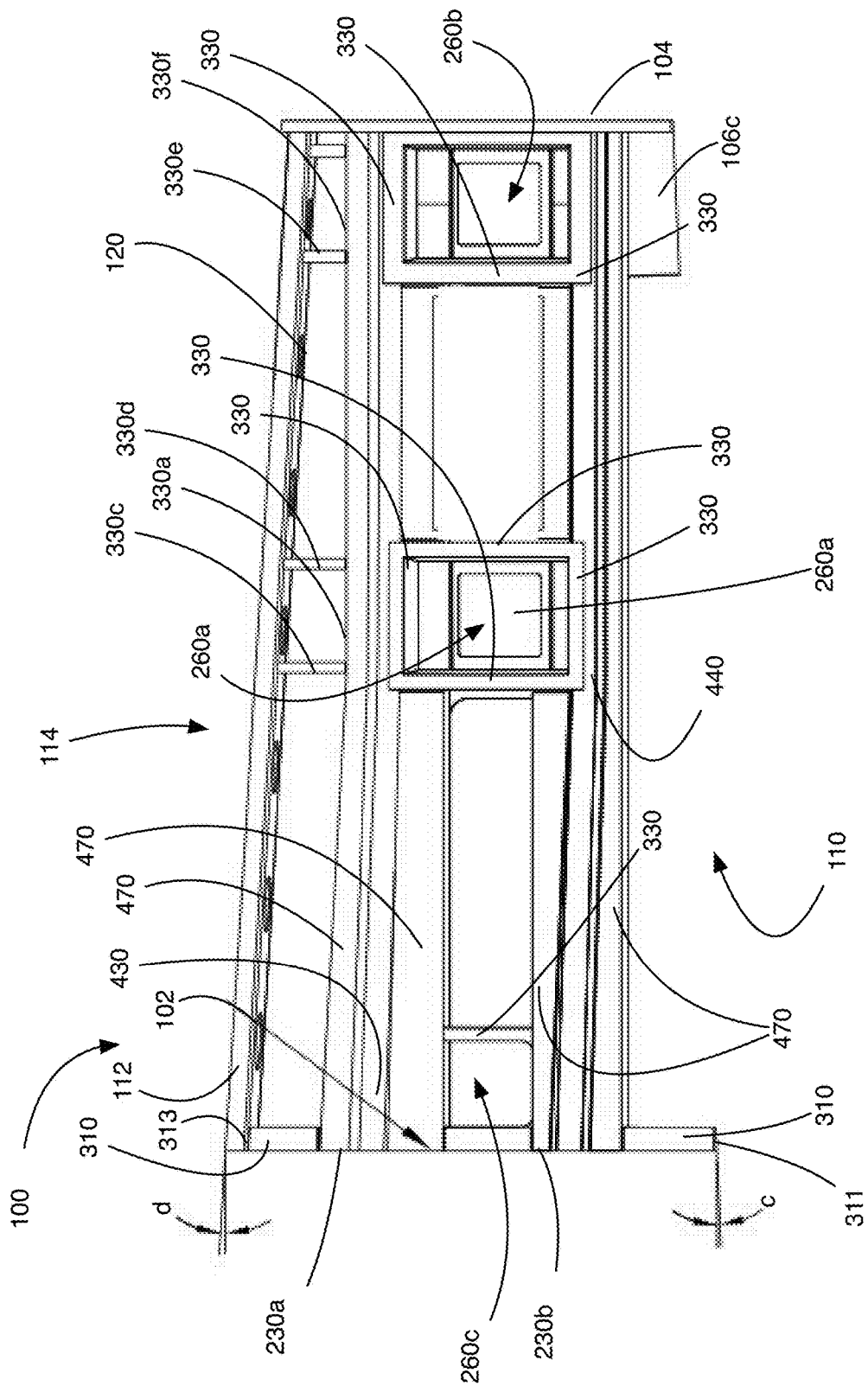
FIG. 4C is a top side view of the remaining wing structure of FIG. 4B.

FIG. 4B is a perspective tip side view of the remaining wing structure of FIG. 3 with the wing skin removed. FIG. 4C is a top side view of the remaining wing structure of FIG. 4B.

In the exemplary embodiment of FIGS. 1-4, As described previously herein, when the wing 100 is fully assembled and engaged to the fuselage 22 of the aircraft 10, the root wall 102 comprises one exemplary embodiment of a root wall engagement flange 310 that extends perpendicularly away from the fuselage 22. The root wall engagement flange 310 at least partially facilitates the reception and support of the four flared spars 230 as they extend spanwise across the remaining wing 100 structure.

More specifically, in the exemplary embodiment of FIGS. 1-4A, the periphery of the root wall 102 and the root wall engagement flange 310 define two exemplary embodiments of spar receiving notches 410a and 410b along its top periphery. The spar receiving notches 410a and 410b are configured to receive one end of the flared spars 230a and 230b respectively (best seen in FIG. 2A). Moreover, the periphery of the root wall 102 and the root wall engagement flange 310 define two exemplary embodiments of spar receiving notches 410c and 410d along its bottom periphery configured to receive one end of the flared spars 230c and 230d respectively. One of ordinary skill in the art understands that the flared spars 430 may be rigidly and structurally engaged to the root wall 102 at the spar receiving notches 410 via structural adhesives like Magnabond™, for example.

Figure 6F:
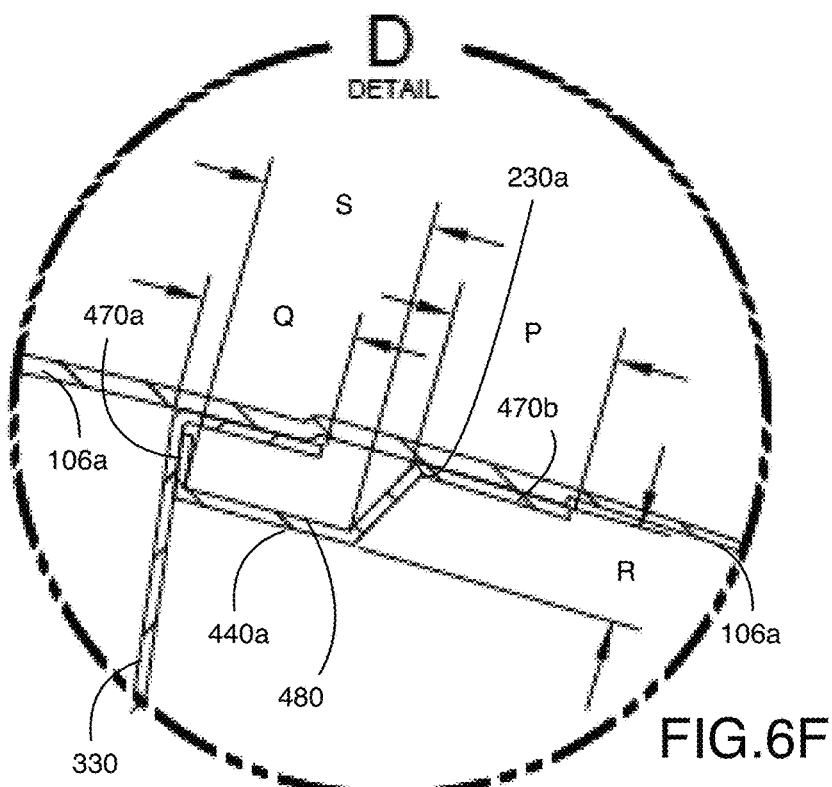
FIG. 6F is a perspective view of detail D of FIG. 6D.
Figure 6G:
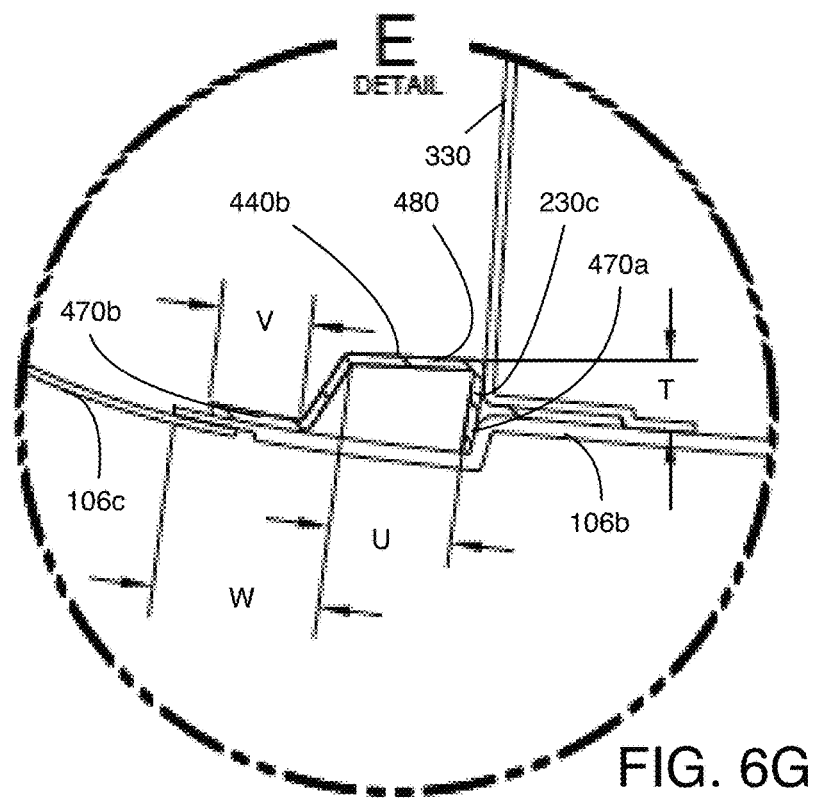
FIG. 6G is a perspective view of detail E of FIG. 6D.

Furthermore, as described previously herein, the flared spars 230 each have a first length 232 defined by an angled hat section 430 (best seen in FIG. 6E; described in greater detail herein), and one or more second lengths 236 defined by a box/housing-coupling section 440 that is slightly distinct from the angled hat section 430 configuration (best seen in FIGS. 6F-6G; described in greater detail herein).

More specifically, in the exemplary embodiment of FIGS. 1-4, each individual flared spar 230 comprises two exemplary embodiments of engagement flanges 470. Each engagement flange 470 runs laterally along the length of the flared spar 230. The engagements flanges 470 are configured to at least partially facilitate the engagement of the flared spars 230 to the wing skin 106. One of ordinary skill in the art understands that the engagements flanges 470 may be rigidly and structurally engaged to the wing skin 106 via structural adhesives like Magnabond™, for example.

Moreover, one of ordinary skill in the art understands that each individual flared spar 230 and/or its engagements flanges 470 may have different widths (best seen in the difference between the flared spar 230a and 230b at FIG. 4C). The flared spars 230 may have a height of between about 0.50 and about 1.50 inches, and preferably about 0.95 inches (described in greater detail herein) but may change slightly when interfacing the root wall 102 or the wing tip wall 104. The hat section 430 of each flared spar 230 (described in greater detail herein) usually must be wide enough to distribute the lateral and torsional load of the wing 100 structure. The hat section 430 may be between about 1.50 inches and about 2.50 inches, and preferably about 1.80 inches in width in one exemplary embodiment. The engagement flanges 470a, b may have an engagement surface width of between about 1.25 inches to about 2.20 inches (best seen in FIG. 6C Detail C). Where each flared spar 230 interfaces with other structural members of the wing 100 structure, the engagement flanges 470 are trimmed to accommodate the structural member as is shown in FIGS. 6F and 6G. The interface region where each engagement flange 470 is trimmed may be bonded via structural adhesives like Magnabond™, for example. The engagement flange 470a shall have as much of its height (about 0.95 inch as noted above) retained as possible in the interface location.

Furthermore, as described previously herein, the wing 100 also comprises three exemplary embodiments of box sections/housings 260 that are made up of vertical wing walls 330. The one or more second lengths 236 of the flared spars 230 accommodate the box sections/housings 260, or any other internal component of the wing 100 that is situated along the path of the flared spars 230. Moreover, in the exemplary embodiment of FIGS. 1-4, the wing 100 also comprises other vertical wing walls 330 that are not part of a box section/housing 260. For example, the wing 100 comprises various vertical wing walls 330 that bound the first internal cavity 265, the second internal cavity 270, the third internal cavity 275, and the fourth internal cavity 290 (best seen in FIG. 2).

Referring now to FIG. 4C, FIG. 4C is a top side view of the remaining wing structure of FIG. 4B. The exemplary embodiment illustrated in FIG. 4C is similar to the exemplary embodiments illustrated in FIGS. 1-4B; therefore, only the differences between these exemplary embodiments are described.

When the fully assembled wing 100 is engaged to the fuselage 22 of the aircraft 10, the leading edge 110 of the wing 100 defines a slope angle c of between about 1.00 degrees to about 3.00 degree, and preferably about 2.00 degrees, between the root wall 102 and the tip wall 104. Moreover, the trailing end 114 defines a slope angle d of between about 3.75 degrees to about 4.25 degrees, and preferably about 4.00 degrees, between the root wall 102 and the tip wall 104. One of ordinary skill in the art understands that the particular stub-wing construction of the exemplary embodiment of FIGS. 1-4 is but one non-limiting embodiment of the system and method of the present disclosure.

Referring now to FIG. 5, FIG. 5 is a top side view of the exploded fuel bladder of FIG. 3. The exemplary embodiment illustrated in FIG. 5 is similar to the exemplary embodiments illustrated in FIGS. 1-4C; therefore, only the differences between these exemplary embodiments are described.

As described previously herein, the section 520 of the fuel bladder 200 may comprise a substantially flat/planar or curved surface relative to the curved shape of the curved leading edge 110 of the wing 100. Moreover, the section 530 may comprise a substantially flat/planar or curved surface. Moreover, the overall shape, configuration, and outer geometry of the fuel bladder 200 between the section 520 and the section 530 substantially complements the fuel bladder cavity 350 within the wing 100 structure.

One of ordinary skill in the arts understands that this specific "two prong" fuel bladder shape is but one non-limiting embodiment of the system and method of the present of disclosure, especially because the internal components of the wing 100, such as the box sections/housings 260, depends entirely on the type of wing/aircraft. Moreover, one of ordinary skill in the art understands that the shape, size, numbering, and positioning of box sections/housings 260 also depends on the type of wing/aircraft. For example, civil/private aircraft may have no need for box sections/housings 260 within the wing 100 because they have no need to bare the load of a payload 20 onto the box sections/housings 260.

Furthermore, in the exemplary embodiment of FIGS. 1-5, the layered membrane 510 of the fuel bladder 200 (best seen in FIG. 6A; described in greater detail herein) defines four flared spar-receiving grooves 280 along its top and bottom sides configured to receive the flared spars 230 (best seen in FIG. 6A). More specifically, the flared spar-receiving grooves 280 are configured to receive the engagement flanges 470 and the trough 480 along both the first length 232 defined by the angled hat section 430 (best seen in FIG. 6E; described in greater detail herein) and the one or more second lengths 236 defined by the box/housing-coupling section 440 (best seen in FIG. 6G-6F; described in greater detail herein). Moreover, when the fuel bladder 200 is pushed/flexed into the fuel bladder cavity 350 of the wing 100 structure, the fuel bladder 200 fits snuggly up against the surrounding external wing structure, such as the wing skin 106, the box sections/housings 260, and the flared spars 230 (best seen in FIG. 6A).

Furthermore, in the exemplary embodiment of FIGS. 1-5, the inboard "prong" 540 of the fuel bladder 200, which would be situated proximate to the root wall 102 in a fully assembled and attached wing 100 structure, has a width E of between about 25.00 inches to about 45.00 inches, and preferably about 32.00 inches, and a length F of between about 25.00 inches to about 45.00 inches, and preferably about 32.00 inches. The extension 565 off of the inboard "prong" 540 of the fuel bladder 200, which would be situated proximate to the root wall 102 and the leading edge 110 in a fully assembled and attached wing 100 structure, has a width G of between about 2.00 inches to about 5.00 inches, and preferably about 3.60 inches. Moreover, the outboard "prong" 560 of the fuel bladder 200, which would be situated proximate to the tip wall 104 in a fully assembled and attached wing 100 structure, has a width H of between about 10.00 inches to about 30.00 inches, and preferably about 20.42 inches, and a length I of between about 15.00 inches to about 35.00 inches, and preferably about 26.00 inches. The junction 576 between the inboard "prong" 540 and the outboard "prong" 560 of the fuel bladder 200 has a width J of between about 1.00 inches to about 2.00 inch, and preferably about 1.77 inches, and length K of between about 7.00 inches to about 12.00 inches, and preferably about 9.13 inches.

Referring now to FIG. 6A, FIG. 6A is a sectional view of the fully assembled wing along section A-A of FIG. 1B and FIG. 1E. The exemplary embodiment illustrated in FIG. 6A is similar to the exemplary embodiments illustrated in FIGS. 1-5; therefore, only the differences between these exemplary embodiments are described.

Section A-A of FIG. 1B and FIG. 1E cuts across the wing 100 from the removable forward wall 108 through the wing skin 106, the fuel bladder 200 (along the inboard "prong" 540), the parallel flared spars 230b and 230c (along a portion of the first length 232), the parallel flared spars 230a and 230d (along a portion of the first length 232), the vertical wing wall 330a, and the aft wall 112. Section A-A reveals the layered membrane 510 of the fuel bladder 200, the internal cavity 590 of the fuel bladder 200, the angled hat section 430 of each flared spar 230, and the unfilled trailing end cavity 122.

In the exemplary embodiment of FIG. 1-6A, as described previously herein, the vertical wing wall 330a extends spanwise parallel to the aft wall 112 and provides support for the portion 530 of the fuel bladder 200. Moreover, the four flared spar-receiving grooves 280 defined by the layered membrane 510, and the rest of the fuel bladder 200, press firmly up against the surrounding wing 100 structure. The fuel bladder 200, therefore, leaves only a minimal amount of unused volume.

Referring now to FIG. 6B, FIG. 6B is a sectional view of the fully assembled wing along section B-B of FIG. 1B and FIG. 1E. The exemplary embodiment illustrated in FIG. 6B is similar to the exemplary embodiments illustrated in FIGS. 1-6A; therefore, only the differences between these exemplary embodiments are described.

Section B-B of FIG. 1B and FIG. 1E cuts across the wing 100 from the supplemental portion of wing skin 106c through the wing skin 106, the box section/housing 260b, the parallel flared spars 230b and 230c (along a portion of the second length 236), the parallel flared spars 230a and 230d (along a portion of the second length 236), the vertical wing wall 330a, and the aft wall 112. Section B-B reveals the second internal cavity 270 of the wing 100, the internal cavity within the box section/housing 260b, the fourth internal cavity 290 of the wing 100, the box/housing-coupling section 440 of each flared spar 230, and the unfilled trailing end cavity 122.

In the exemplary embodiment of FIG. 1-6B, as described previously herein, the vertical wing walls 330 engage directly up against the wing skin 106. One of ordinary skill in the art understands that the vertical wing walls 330 may be engaged to the wing skin 106 via any method known to one having ordinary skill in the art. For example, in one exemplary embodiment, each vertical wing wall 330 may have an engagement flange on each end. Moreover, one of ordinary skill in the art understands that that the vertical wing walls 330 may be engaged to the wing skin 106 via fasteners, such as screws. However, other fasteners may be employed. Other fasteners may include, but are not limited to, rivets, nails, nuts and bolts, adhesives, welds, and the like.

Furthermore, as described previously herein, the second length 236 of the flared spars 230, which are configured to extend around any internal wing components (such as the vertical wing walls 33) have a different shape and configuration than the first length 232 of the flared spars 230 which define the angled hat sections 430.

Referring now to FIG. 6C, FIG. 6C is a sectional view of the wing along section A-A of FIG. 1B and FIG. 1E with the exemplary embodiment of the fuel bladder removed. The exemplary embodiment illustrated in FIG. 6C is similar to the exemplary embodiments illustrated in FIGS. 1-6B; however, FIG. 6C contains detail C of FIG. 6E.

Referring now to FIG. 6D, FIG. 6D is a sectional view of the wing along section B-B of FIG. 1B and FIG. 1E with the exemplary embodiment of the fuel bladder removed. The exemplary embodiment illustrated in FIG. 6D is similar to the exemplary embodiments illustrated in FIGS. 1-6C; however, FIG. 6D contains details D and E of FIGS. 6F and 6G, respectively.

Referring now to FIG. 6E, FIG. 6E is a perspective bottom side view of detail C of FIG. 6C. The exemplary embodiment illustrated in FIG. 6E is similar to the exemplary embodiments illustrated in FIGS. 1-6D; therefore, only the differences between these exemplary embodiments are described.

Detail C of FIG. 6C reveals one exemplary embodiment of an angled hat section 430, along a portion of the first length 232 of the flared spar 230d, at the point of engagement of the bottom wing skin component 106b and the engagement flanges 470. The angled hat section 430 has a more flared shape, as defined by the exemplary embodiment of a trough 480, when compared to traditional orthogonal/squared hat sections. The angled hat section 430, therefore, is configured to distribute the force acting on the wing 100 structure and, consequently, the flared spar 230d is configured to provide torsional stiffness and tensile reinforcement.

Furthermore, in the exemplary embodiment of FIGS. 1-6E, the hat section 430 of spar 230d which defines channel or trough 480 has at least three sides that extend away and are not contacting the wing skin 106b. The spar 230d of this figure further has two engagement flange sections 470a, 470b. It is noted that each spar 230 may have multiple different cross-sections along its length since the geometry of the cross-section may change when a particular spar 230 engages and/or helps form a utility housing 260.

Furthermore, in the exemplary embodiment of FIGS. 1-6E, the trough 480 of the angled hat section 430 has a depth L of between about 0.70 inches to about 1.20 inches, and preferably about 0.95 inches, and a width M, at its bottom, of between about 1.20 inches to about 2.50 inches, and preferably about 1.80 inches. The engagement flange 470a has a width N of between about 1.20 inches to about 2.50 inches, and preferably about 1.80 inches, and the engagement flange 470b has a width O of between about 1.50 inches to about 3.00 inches, and preferably about 2.20 inches. One of ordinary skill in the art understands that this particular angled hat section 430 construction for a stub-wing, and all the angles derivable therefrom, is but one non-limiting embodiment of the angled hat section 430.

Referring now to FIG. 6F, FIG. 6F is a perspective bottom side view of detail D of FIG. 6D. The exemplary embodiment illustrated in FIG. 6F is similar to the exemplary embodiments illustrated in FIGS. 1-6E; therefore, only the differences between these exemplary embodiments are described.

Detail D of FIG. 6D reveals one exemplary embodiment of a box/housing-coupling section 440a, along a portion of the second length 236 of the flared spar 230a, at the point of engagement of the top wing skin component 106a, the engagement flanges 470, and the vertical wing walls 330. The box/housing-coupling section 440a has a different geometry relative to the angled hat section 430 configuration of each spar 230. For example, in the particular embodiment of FIGS. 1-6, the box/housing-coupling section 440a is similarly angled/shaped, on the side with the engagement flange 470b, as the angled hat section 430. On the other side, proximate to the engagement flange 470a, however, the box/housing-coupling section 440a is shorter and more orthogonal such that the engagement flange 470a may engage directly up against one side of the vertical wing wall 330. The box/housing-coupling section 440a, therefore, is configured to distribute the force acting on the wing 100 structure, but it is also configured to accommodate a portion of the box section/housing 260b lying in the path of the flared spar 230a.

Furthermore, in the exemplary embodiment of FIGS. 1-6F, relative to the spar 230d of FIG. 6E, the spar 230a of FIG. 6F has a coupling section 440a that has walls/sections which extend away from the wing skin 106a to form the channel or trough 480. One of the walls of the coupling section 440a contacts and is coupled to a wall 330 that may help form one of the utility housings 260. Relative to the spar 230d of FIG. 6E, this spar 230a of FIG. 6D has a single engagement flange 470b that is coupled to the wing skin 106a.

Furthermore, in the exemplary embodiment of FIGS. 1-6F, the trough 480 of the box/housing-coupling section 440a has a depth R of between about 0.50 inches to about 1.50 inches, and preferably about 0.95 inches, and a width S, at its bottom, of between about 1.00 inches to about 3.00 inch, and preferably about 1.82 inches. The engagement flange 470b has a width P of between about 1.00 inches to about 2.50 inches, and preferably about 1.65 inches. Detail D of FIG. 6D also reveals that the engagement flange of the vertical wall 330 has a width Q of between about 1.00 inches to about 2.00 inches, and preferably about 1.45 inches. One of ordinary skill in the art understands that this particular box/housing-coupling section 440a construction for a stub-wing, and all the angles derivable therefrom, is but one non-limiting embodiment of the box/housing-coupling section 440a.

Referring now to FIG. 6G, FIG. 6G is a perspective bottom side view of detail E of FIG. 6D. The exemplary embodiment illustrated in FIG. 6G is similar to the exemplary embodiments illustrated in FIGS. 1-6F; therefore, only the differences between these exemplary embodiments are described.

The cross-sectional geometry of this spar 230c illustrated in FIG. 6G is similar to the cross-sectional geometry of the spar 230a of FIG. 6D. Like FIG. 6D, this spar 230c of FIG. 6G has a coupling section 440b that has walls/sections which extend away from the wing skin 106b to form the channel or trough 480. One of the walls 470a of the coupling section 440b contacts and is coupled both to a wall 330 that may help form one of the utility housings 260 as well as to the wing skin 106b.

Detail E of FIG. 6D reveals another exemplary embodiment of a box/housing-coupling section 440b, along a portion of the second length 236 of the flared spar 230c, at the point of engagement of the bottom wing skin component 106b, the supplemental wing skin component 106c the engagement flanges 470, and the vertical wing walls 330. The box/housing-coupling section 440b also deviates from the angled hat section 430 configuration. For example, in the particular embodiment of FIGS. 1-6, the box/housing-coupling section 440b is similarly angled/shaped, on the side with the engagement flange 470b, as the angled hat section 430. On the other side, proximate to the engagement flange 470a, however, the box/housing-coupling section 440b is shorter and more orthogonal such that the engagement flange 470a may engage directly up against one side of the vertical wing wall 330. The box/housing-coupling section 440b, therefore, is configured to distribute the force acting on the wing 100 structure, but it is also configured to accommodate a portion of the box section/housing 260b lying in the path of the flared spar 230a. The box/housing-coupling section 440b also deviates from the box/housing-coupling section 440a configuration in that the engagement flange 470a is long enough to bridge the gap/margin between the wing skin 106 and the vertical wing wall 330.

Furthermore, in the exemplary embodiment of FIGS. 1-6, the trough 480 of the box/housing-coupling section 440b has a depth T of between about 0.25 inches to about 0.75 inches, and preferably about 0.60 inches, and a width U, at its bottom, of between about 1.50 inches to about 3.00 inches, and preferably about 1.82 inches. The engagement flange 470b has a width V of between about 1.00 inches to about 1.50 inches, and preferably about 1.25 inches. Detail D of FIG. 6D also reveals that the engagement flange 470 to the bottom of the trough 480 has a width W of between about 0.80 inches to about 1.60 inches, and preferably about 1.20 inches. One of ordinary skill in the art understands that this particular box/housing-coupling section 440b construction for a stub-wing, and all the angles derivable therefrom, is but one non-limiting embodiment of the box/housing-coupling section 440b.

Referring now to FIGS. 7A-7E, FIGS. 7A-7E are a flow chart of an exemplary embodiment of a method of fully assembling the wing of FIG. 1A and attaching the wing to the aircraft of FIG. 1A. One of ordinary skill in the art understands that the exemplary method 600 may be performed by various manufacturing means that do not limit the scope of the present disclosure.

Figure 7A:
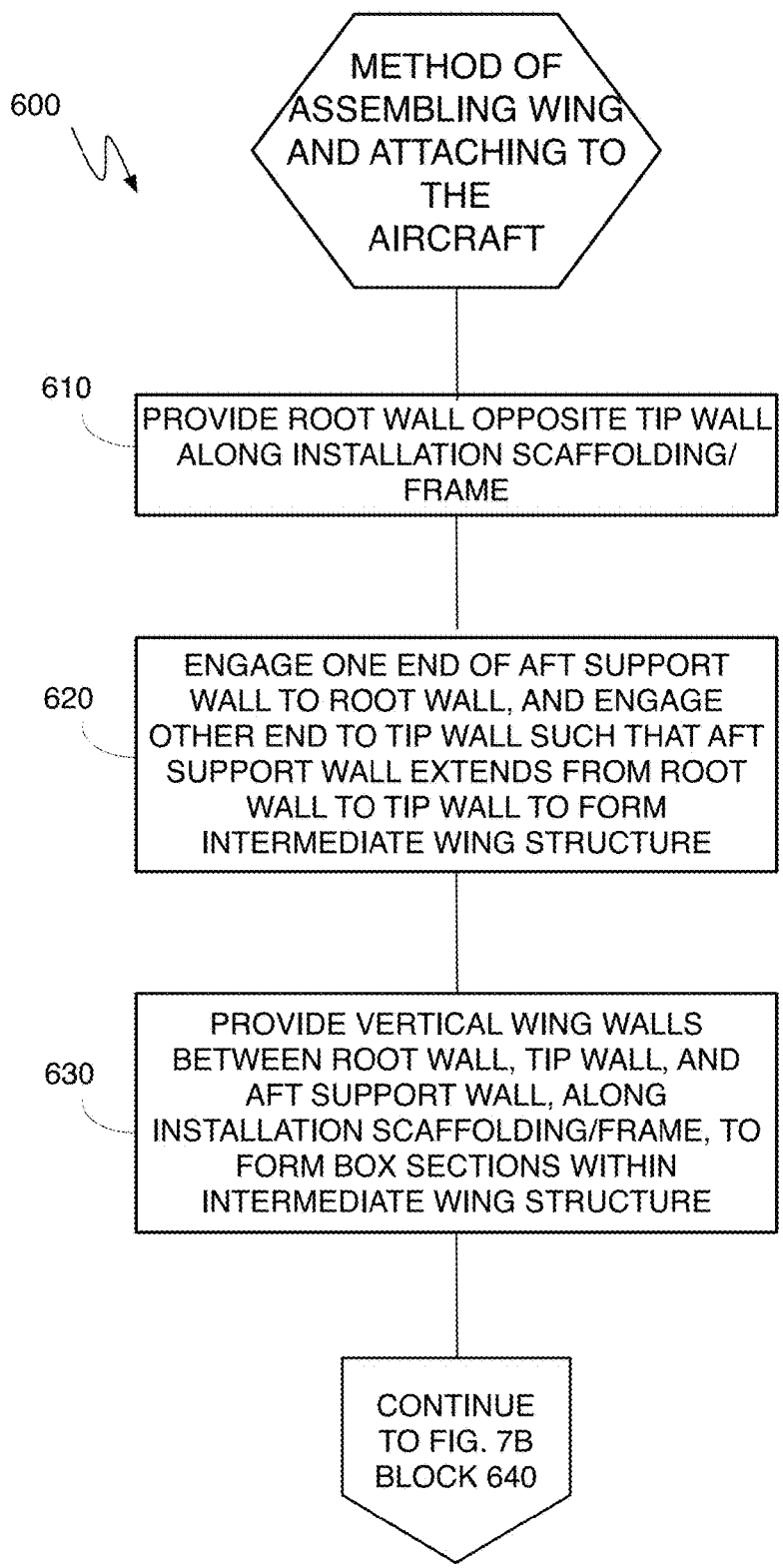
FIGS. 7A-7E are a flow chart of an exemplary embodiment of a method of fully assembling the wing of FIG. 1A and attaching the wing to the aircraft of FIG. 1A.

More specifically, at block 610 of FIG. 7A, a root wall 102 may be placed opposite, parallel to a tip wall 104 along an installation scaffolding/frame. One having ordinary skill in the art understands that an installation scaffolding/frame is but one means of holding the individual wing components as the intermediate wing 100 structure is being assembled. The curved front end 311 and the flat or substantially planar back end 313 of the root wall 102 are aligned with the curved front end 321 and the flat or substantially planar back end 323 of the tip wall 102. The root wall engagement flange 310 (best seen in FIG. 4B) around the periphery of the root wall 102 is facing towards the tip wall 102 (perpendicularly, laterally away from the primary plane of the root wall 102) such that the root wall engagement flange 310 may receive the other structural components of the wing 100 (the flared spars 230, for example).

At block 620 of FIG. 7A, one end of an aft wall 112 may be engaged along the flat or substantially planar back end 313 of the root wall 102, and the other end of the aft wall 112 may be engaged along the flat or substantially planar back end 323 of the tip wall 104 via a structural adhesives like Magnabond™. The aft wall 112 forms a flush/near-flush junction between it and the root wall 102 and the tip wall 104. Consequently, the aft wall 112 defines a planar trailing end 114 (best seen in FIG. 1B) for the wing structure 100.

At block 630 of FIG. 7A, vertical wing walls 330, and any other internal wing components, may be placed along the installation scaffolding/frame between the wing structure comprising the root wall 102, the tip wall 103, and the aft wall 112. Some of the vertical wing walls 330 form at least partially the box sections/housing 260. Some of the vertical wing walls 330 bound the first internal cavity 265, the second internal cavity 270, the third internal cavity 275, and the fourth internal cavity 290 (best seen in FIG. 2).

Figure 7B:
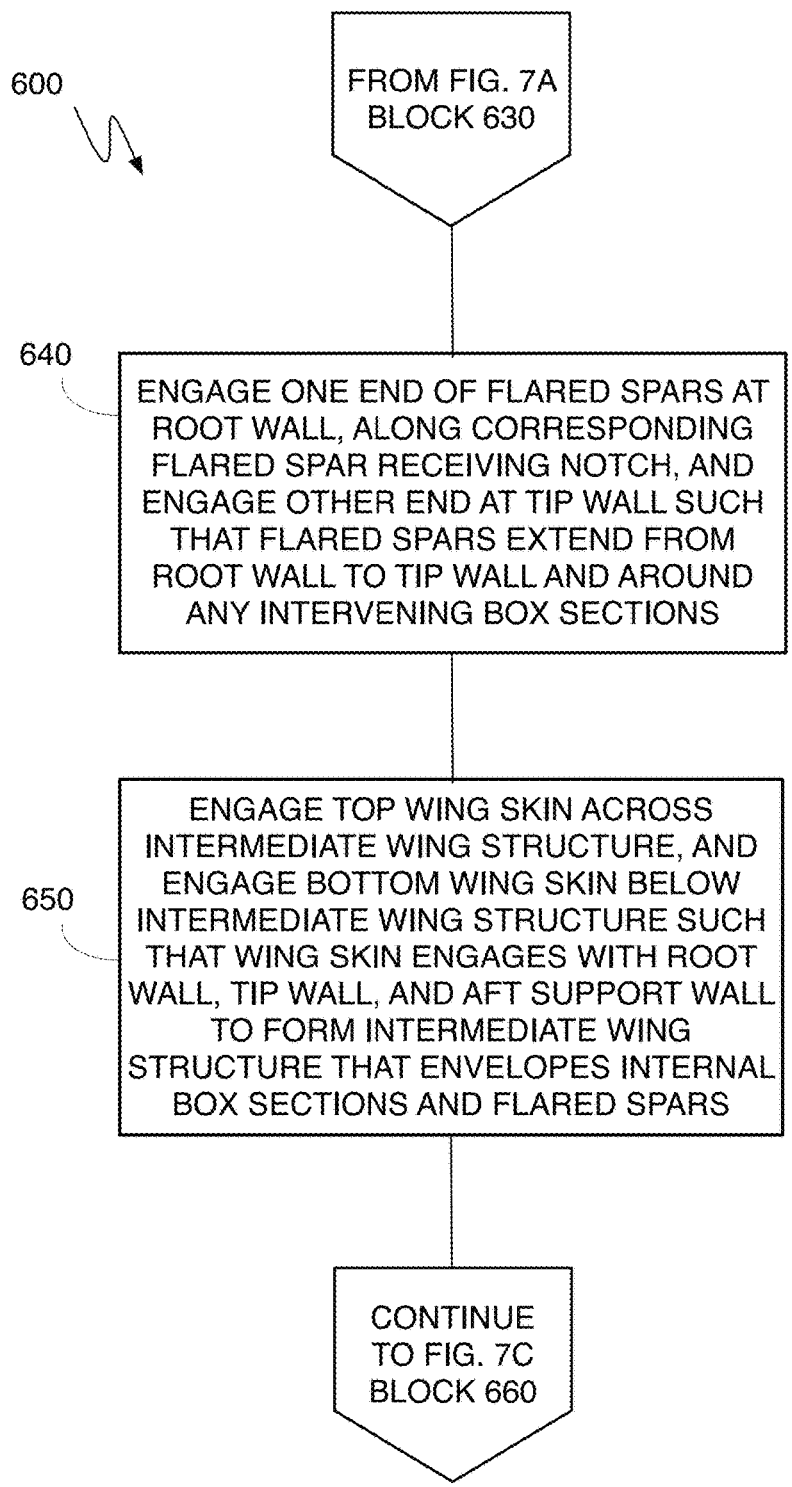

At block 640 of FIG. 7B, one end of each flared spar 230 may be engaged at the root wall 102 along their corresponding flared spar notch 410, and the other end of each flared spar 230 may be engaged at the tip wall 104, via a structural adhesives like Magnabond™. The flared spars 230, therefore, extend spanwise across the intermediate wing structure 100. The first lengths 232 and the one or more second lengths 236 of each flared spar 230 lines up, where necessary, to accommodate the box sections/housings 260 or any other internal component of the intermediate wing 100 structure.

At block 650 of FIG. 7B, a top wing skin component 106a, a bottom wing skin component 106b and a supplemental wing skin component 106c may be engaged to the intermediate wing 100 structure comprising the root wall 102, the tip wall 103, and the aft wall 112, via a fastener/welding. The wing skin 106 forms a flush/near-flush junction between it and the existing intermediate wing structure to form a stub-wing structure the envelopes the installation scaffolding/frame, the vertical wing walls 330, and the flared spars 230.

Figure 7C:
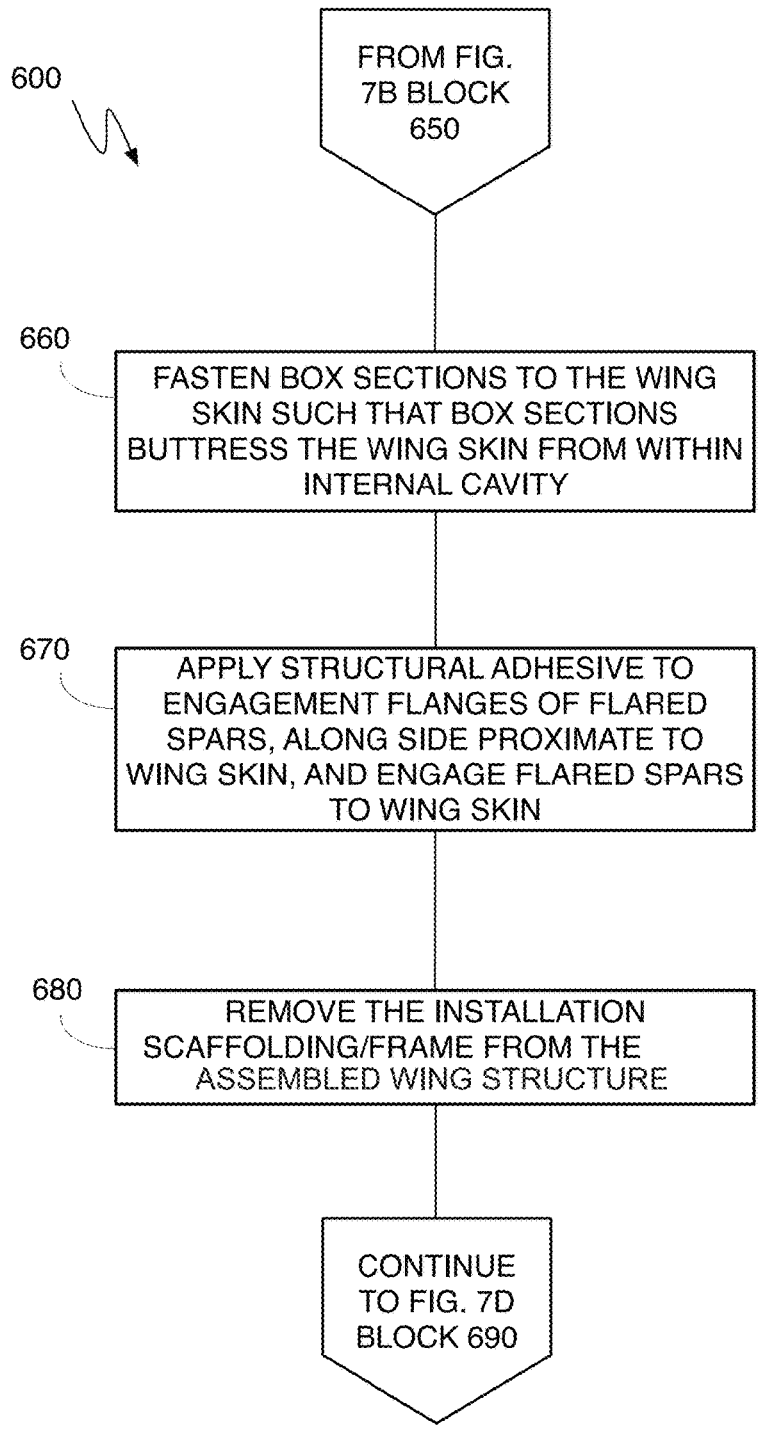

At block 660 of FIG. 7C, the vertical wing walls 330 and any other internal wing component may be engaged to the wing skin 106 via a fastener/welding. The vertical wing walls 330 and the wing skin 106 form the box sections/housings 260, the first internal cavity 265, the second internal cavity 270, the third internal cavity 275, and the fourth internal cavity 290 (best seen in FIG. 2).

At block 670 of FIG. 7C, the flared spars 230 may be engaged to the wing skin 106 and the vertical walls 330, via the engagement flanges 470, such that the flared spars provide sufficient torsional stiffness to the wing 100. More specifically, the flared spars 230 may be engaged to the wing skin 106 and/or the vertical walls 330 via a structural adhesives like Magnabond™ that is placed along the side of the engagement flanges 470 that is proximate to the wing skin 106 and/or the vertical walls 330. The angled hat section 430 and the box/housing-coupling section 440 along the length of the flared spars distribute the force acting on the wing 100 structure and provide torsional stiffness and tensile reinforcement.

At block 680 of FIG. 7C, the installation scaffolding/frame is removed from the internal cavity 350 within the wing structure 100 without disturbing the structural integrity of the remaining wing 100 structure 100.

Figure 7D:
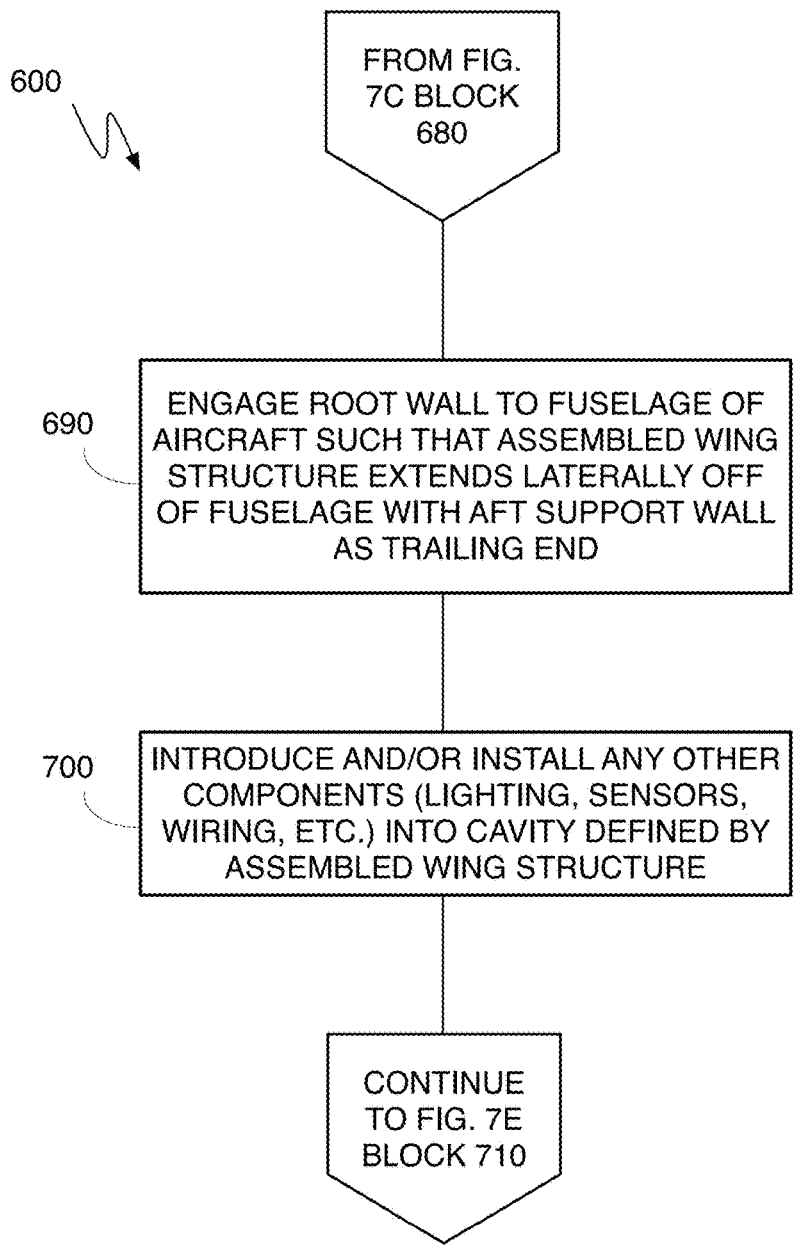

At block 690 of FIG. 7D, the wing structure is engaged, via the root wall 102, to the aircraft 10 such that the structure extends laterally, perpendicularly off of the fuselage 22, with the aft wall 112 as the trailing end of the wing 100. The root wall 102 couples to/along the contours and surface features of the fuselage 22 along the area of engagement with the aircraft 10 such that any engagement is flush/near-flush. The tip wall 104 of the wing 100 is situated opposite the root wall 102 and terminates the wing 100 structure.

At block 700 of FIG. 7D, any other internal/external winging components (such as lighting, sensors, wiring, fins, rudders, elevators, stabilizers, flaps, ailerons, trim tabs, etc.) may be installed in and/or onto the wing 100. The electrical and mechanical systems of the aircraft 10 may be communicatively coupled to any wing component (such as the payload 20, for example) through the fuselage 22 and into the wing 100.

Figure 7E:
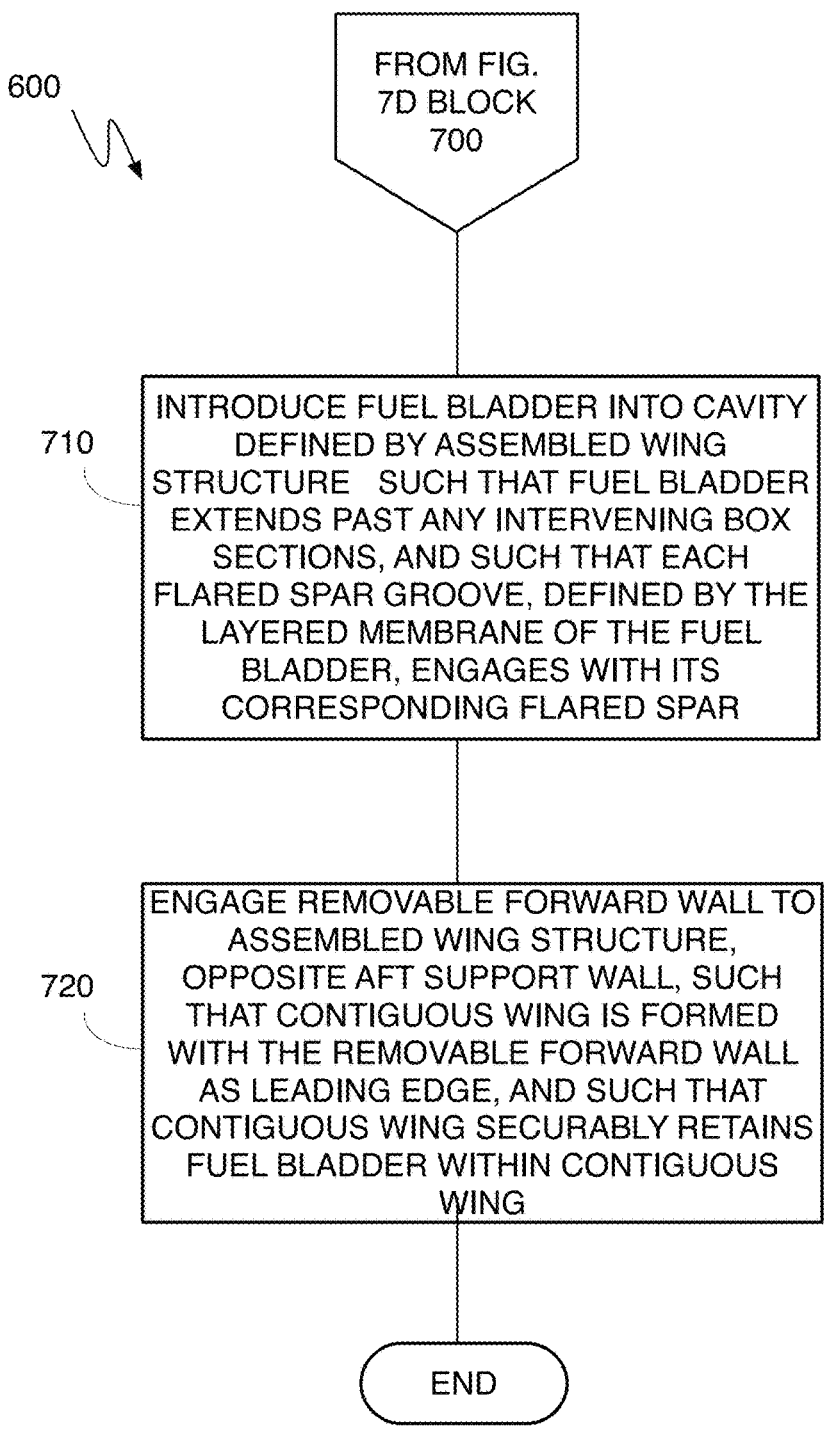

At block 710 of FIG. 7E, a contiguous fuel bladder 200 may be introduced into the internal cavity 350 defined by the wing structure. Because the outer geometry of the fuel bladder 200 substantially mirrors the geometry of the inner surface of the wing 100 structure, the fuel bladder 200 may be inserted/pushed/flexed, via the opening 124, into the fuel bladder cavity 350 (best seen in FIG. 3). Moreover, because the outer geometry of the fuel bladder 200 additionally defines the corresponding flared spar-receiving grooves 280, the fuel bladder 200 may accommodate and receive the flared spars 230 when the fuel bladder 200 is received by the fully assembled and attached wing 100 structure.

Furthermore, at block 710, the planar section 530 of the fuel bladder 200 (best seen in FIG. 3) may be positioned proximate the planar trailing end 114 and the unfilled trailing end cavity 122 between the fuel bladder 200 and the aft wall 112. Moreover, the curved the section 520 of the fuel bladder 200 may be positioned proximate the curved leading edge 110. The fuel bladder 200, therefore, leaves only the minimal amount of unused volume within the trailing end cavity 122, the box sections/housings 260, the first internal cavity 265, the second internal cavity 270, the third internal cavity 275, and the fourth internal cavity 290 (best seen in FIG. 2B).

At block 720 of FIG. 7E, a removable forward wall 108 may be engaged to the wing 100 structure, opposite the aft wall 112, such that a single contiguous wing is formed with the removable forward wall as the leading edge 110 of the wing 100. The removable forward wall 108 forms a flush/near-flush junction between it and the root wall 102 and the wing skin 106. Consequently, the removable forward wall 112 defines a curved leading edge 110 (best seen in FIG. 1B) for the fully assembled and attached wing 100. More specifically, the removable forward wall 108 covers the opening 124 that accesses the fuel bladder internal cavity 350 of the wing 100—wherein the fuel bladder 200 is situated. The removable forward wall 108 may be engaged to the root wall engagement flange 310 and the wing skin engagement flange 320 via a fastener/weld.

Certain steps in the exemplary method described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A wing structure comprising:
   a root wall opposite to a wing tip wall;
   a plurality of spars extending longitudinally from the root wall to wing tip wall and coupled to the root wall and the wing tip wall;
   a wing skin extending from the root wall to the wing tip wall and coupled to each spar and to the root wall and wing tip wall, each spar comprising a multisided cross-sectional shape that forms a closed channel between an internal region of the multi-sided cross-sectional shape and a side of the wing skin, whereby the spars, root wall, wing tip wall, and wing skin define a volume maximized for internal storage while maintaining strength of the wing structure; and
   at least one utility housing formed within the volume and coupled to at least one or more spars;
   wherein the multi-sided cross-sectional shape that forms a closed channel for each spar further comprises:
      a coupling section that is fastened to a wall of a utility housing; and
      an engagement flange section that is coupled to the wing skin.

2. The wing structure of claim 1, wherein the wing skin comprises a plurality of sections that are coupled to the spars, root wall, and wing tip wall.

3. The wing structure of claim 2, wherein one of the wing sections comprises a half-elliptical cross-sectional shape configured to be removable relative to the other wing sections and provides an opening to the volume defined by the spars, root wall, and wing tip wall.

4. The wing structure of claim 3, wherein the multi-sided cross-sectional shape that forms a closed channel for each spar further comprises:
   a hat section; and
   two engagement flange sections that are coupled to the wing skin.

5. The wing system of claim 3, wherein the multi-sided cross-sectional shape that forms a closed channel for each spar further comprises: a hat section; and two engagement flange sections that are coupled to the wing skin.

6. The wing structure of claim 2, wherein the multi-sided cross-sectional shape that forms a closed channel for each spar further comprises:
   a hat section; and
   two engagement flange sections that are coupled to the wing skin.

7. The wing system of claim 2, wherein the multi-sided cross-sectional shape that forms a closed channel for each spar further comprises: a hat section; and two engagement flange sections that are coupled to the wing skin.

8. The wing structure of claim 1, wherein the multi-sided cross-sectional shape that forms a closed channel for each spar further comprises:
   a hat section; and
   two engagement flange sections that are coupled to the wing skin.

9. A wing system comprising:
   a root wall opposite to a wing tip wall;
   a plurality of spars extending longitudinally from the root wall to wing tip wall and coupled to the root wall and the wing tip wall; and a wing skin extending from the root wall to the wing tip wall and coupled to each spar and to the root wall and wing tip wall, each spar comprising a multisided cross-sectional shape that forms a closed channel between an internal region of the multi-sided cross-sectional shape and a side of the wing skin, whereby the spars, root wall, wing tip wall, and wing skin define a volume maximized for internal storage while maintaining strength of the wing structure;
   a flexible fuel bladder positioned within the volume; and
   at least one utility housing formed within the volume and coupled to at least one or more spars;
   wherein the multi-sided cross-sectional shape that forms a closed channel for each spar further comprises:
      a coupling section that is fastened to a wall of a utility housing; and
      an engagement flange section that is coupled to the wing skin.

10. The wing system of claim 9, wherein the wing skin comprises a plurality of sections that are coupled to the spars, root wall, and wing tip wall.

11. The wing system of claim 10, wherein one of the wing sections comprises a half-elliptical cross-sectional shape configured to be removable relative to the other wing sections and provides an opening to the volume defined by the spars, root wall, and wing tip wall.

12. The wing system of claim 10, wherein the multi-sided cross-sectional shape that forms a closed channel for each spar further comprises: a hat section; and two engagement flange sections that are coupled to the wing skin.

13. The wing system of claim 10, wherein the flexible fuel bladder has a geometry which substantially mirrors the volume defined by the spars, root wall, wing tip wall, and wing skin.

14. The wing system of claim 10, wherein the flexible fuel bladder comprises a groove (280) for receiving an outer geometry of at least one spar.

15. The wing system of claim 10, wherein flexible fuel bladder comprises a U-shaped opening for receiving a utility housing.

16. The wing system of claim 9, wherein the multi-sided cross-sectional shape that forms a closed channel for each spar further comprises: a hat section; and two engagement flange sections that are coupled to the wing skin.

17. The wing system of claim 9, wherein the flexible fuel bladder has a geometry which substantially mirrors the volume defined by the spars, root wall, wing tip wall, and wing skin.

18. The wing system of claim 9, wherein the flexible fuel bladder comprises a groove (280) for receiving an outer geometry of at least one spar.

19. The wing system of claim 9, wherein flexible fuel bladder comprises a U-shaped opening for receiving a utility housing.

20. The wing system of claim 9, wherein the flexible fuel bladder is a type which is at least one of: (a) crashworthy and self-sealing; (b) crashworthy and non-self-sealing; (c) crash resistant and self-sealing; and (d) crash resistant and non-self-sealing.

* * * * *